(12) United States Patent
Zou

(10) Patent No.: US 12,061,866 B2
(45) Date of Patent: Aug. 13, 2024

(54) COMPUTER IMPLEMENTED METHOD, COMPUTER PROGRAM AND PHYSICAL COMPUTING ENVIRONMENT FOR PRODUCING A DEDICATED ELECTRONIC REPORT

(71) Applicant: Ming Zou, Basel (CH)

(72) Inventor: Ming Zou, Basel (CH)

(73) Assignee: Ming Zou, Basel (CH)

( * ) Notice: Subject to any disclaimer, the term of this patent is extended or adjusted under 35 U.S.C. 154(b) by 0 days.

(21) Appl. No.: 17/648,595

(22) Filed: Jan. 21, 2022

(65) Prior Publication Data
US 2022/0138413 A1 May 5, 2022

Related U.S. Application Data

(63) Continuation-in-part of application No. PCT/EP2020/070628, filed on Jul. 22, 2020.

(60) Provisional application No. 62/876,781, filed on Jul. 22, 2019.

(51) Int. Cl.
*G06F 17/00* (2019.01)
*G06F 9/451* (2018.01)
*G06F 16/22* (2019.01)
*G06F 16/2457* (2019.01)
(Continued)

(52) U.S. Cl.
CPC ............ *G06F 40/186* (2020.01); *G06F 9/451* (2018.02); *G06F 16/2291* (2019.01); *G06F 16/24573* (2019.01); *G06F 40/106* (2020.01)

(58) Field of Classification Search
None
See application file for complete search history.

(56) References Cited

U.S. PATENT DOCUMENTS 5,987,480 A * 11/1999 Donohue ............... G06Q 30/02
715/234
7,370,271 B2 5/2008 Killen et al.
(Continued)

OTHER PUBLICATIONS

International Search Report and Written Opinion dated Oct. 12, 2020 issued in corresponding International Patent Application No. PCT/EP2020/070628.
(Continued)

*Primary Examiner* — Mustafa A Amin
(74) *Attorney, Agent, or Firm* — MEDLER FERRO WOODHOUSE & MILLS PLLC

(57) ABSTRACT

A method and system for producing an Electronic Report Presentation ("ERP") of result values derived from pre-collected data is provided. The method includes providing a set of calls directed to predefined functions that derive the result values and couple the result values to the location pointers. The method further includes automatically storing the coupled result values and location pointers in one or more technical interface datasets and automatically retrieving the coupled result values and location pointers and feeding the result values into the ERP in accordance with an ERP template dataset using the location pointers. The location pointer may include at least two parts, wherein each part refers to a structure of an ERP, wherein the location pointer is automatically calculable. The method is implementable in single or multiple computers that with or without server configurations.

23 Claims, 6 Drawing Sheets

(51) Int. Cl.
*G06F 40/106* (2020.01)
*G06F 40/186* (2020.01)

(56) References Cited

U.S. PATENT DOCUMENTS

2004/0268320 A1* 12/2004 Huin .................... G06F 8/34
717/135
2015/0199346 A1    7/2015 Wieczorek et al.

OTHER PUBLICATIONS

Communication pursuant to Article 94(3) EPC dated Jan. 18, 2024 in EP Appl. No. 20 746 591.5, total pp. 9.

* cited by examiner

COMPUTER IMPLEMENTED METHOD, COMPUTER PROGRAM AND PHYSICAL COMPUTING ENVIRONMENT FOR PRODUCING A DEDICATED ELECTRONIC REPORT

CROSS-REFERENCE TO RELATED APPLICATIONS

The present application is a continuation-in-part of PCT/EP2020/070628, filed Jul. 22, 2020, which claims the benefit of U.S. Application Ser. No. 62/876,781, filed Jul. 22, 2019, the entire contents of which are hereby incorporated by reference in their entirety.

TECHNICAL FIELD

The present invention relates to a computer implemented method for producing a dedicated electronic report presentation of result values derived from data pre-collected in at least one computing platform, a respective physical computing environment and a respective computer program.

BACKGROUND

In research, development, commercial or other fields it is often required to perform analysis on information collected from experiments, tests, or real-world events, pre-processed or non-processed, for specific business questions. After the analysis, it is often required to present the derived results or contents (e.g., numbers, text, tables, charts, images, motions, audios, videos, or the like, hereby referred as "Result Values") in one or more dedicated reports (e.g., docx file, pptx file, xlsx file, pdf file, web page, or the like) for further purposes such as decision making, regulatory submission, and public presentation. With the ongoing trend of digitalization of different industries and more and more application of Internet of Things devices, people typically use multiple computing devices together in different integrated context and require the computing devices to display the derived results on multiple electronic applications that linked with each other (i.e., other than the above-mentioned file format applications, further including real-time dashboard, portable device screen, and monitoring device interface, etc.). For example, the same set of health parameters such as blood pressure from a specific patient may need to be displayed at the same time on a doctor's web-based medical record tablet, on the patient's health management mobile App, on the patient's wearable device screen, and on a printable Microsoft® Word report file. In other cases, a person using multiple electronic computing devices at the same time may need to arrange the reported contents derived from data pre-collected from multiple sources on their electronic applications, across the multiple device interfaces, with some contents on only one interface and other contents repeated in multiple interfaces. For example, a patient may participate in a training and gaming program that integrates virtual reality with guiding videos, monitors the patient's health parameters (e.g. pulse, blood pressure, muscle strength) from wearable devices, and displays those parameters in the patient's virtual reality environment. Hereby, we refer all different types of electronic reporting and presentation formats as Electronic Report Presentation ("ERP").

Nowadays, the process from analysis to reporting is typically implemented with technical means, namely different digital computing platforms including network connections and usage of related data management software, analysis software, and reporting software that provides a coding or scripting environment, in which manifold functions can be applied to manage, analyze, and report the pre-collected data. This technical means typically requires programming activities, as a major part of this means and according to requirements of the different business questions, to customize the computer programs so that to derive specific analysis results from the various pre-collected data and to customize a fit-for-purpose dedicated report so that to present the results. Without such case-by-case customization of functional instructions to the computing platform according to the business questions, the computing platform and its software can neither generate the specific analysis results nor produce the dedicated report for the specific business question on its own.

The full implementation of this technical means to achieve the desired analysis, contents for presentation, and dedicated ERP or ERP still requires substantial technical efforts. For example, within professional data analysis and reporting, such as in clinical trials, the process may involve data cleaning, data preparation, custom analysis and custom report which all has to be programmed. The results are populated into the reporting system and the outputted report is then quality controlled, trouble-shot, modified and the like. These result in a feedback which again has to be implemented by programming. Such cycles or iterative loops typically cause a considerable effort and, thus, high costs and time consumption. The situation may get even worse if plural data sources hosted by different computing platforms are involved, each using different data processing software and content presentation process, and multiple types of ERP are to be produced for the same contents or Result Values.

For deriving the desired Result Values from the pre-collected data and/or outputting the Result Values for presentation on the ERP, the computing platform typically involves a specific scripting software, i.e. a data processing software for analysis and/or reporting, such as C, Python, SQL, SAS, R, Microsoft Excel® and VBA, or the like. The analysis, Result Value derivation process, and the dedicated ERP will typically be implemented by programming according to the specific business question, business rules, and the pre-collected data, often following an established conventional practice or technical workflow.

For analyzing and/or modifying the raw data and/or outputting the analysis results in a report, the computing platform typically involves a specific scripting software, i.e. a data analysis of statistical software, such as Statistical Analysis System (SAS) marketed by SAS Institute, R being a free programming language dedicated for statistical purposes, Python being a high level and multi-purpose programming language, Structured Query Language (SQL) being a standard language designed for management of data held in a relational database management system (RDBMS), Matlab marketed by MathWorks and being a language dedicated for mathematic and statistical analysis, or many more programming languages such as Scala, STADA, Java, Visual Basic, C, or the like. The analysis and the dedicated report will be implemented by programming according to the specific clinical question and the pre-collected data, often following an established conventional practice or technical workflow For example, in pharmaceutical or medical research and development typically clinical trials or other clinical studies are involved at a certain stage. In such studies a large quantity of raw data may be gathered which is stored and maintained in digital form in a computing platform via professional database management systems.

Even though the mentioned data analysis software provides highly flexible and advanced analysis and management of data usually the reporting functionality is rather limited or requiring exceptional programming efforts. Therefore, often specific reporting software is used in addition to provide manual edits on the generic report outputted by the analysis software to achieve a desired quality. Such reporting software may be executed in the same computing platform as the data analysis software or in any other platform or device. For example, the reporting software may be a software of a common desktop environment such as a word processor like Microsoft® Word, a presentation program like Microsoft PowerPoint® or a table calculation like Microsoft Excel®.

Nevertheless, even using both the analysis software and the reporting software, the full implementation of this technical means to achieve the desired analysis and dedicated report still requires substantial technical efforts. Within professional data analysis and reporting as, e.g., in clinical trials, the process may involve data cleaning, data preparation, custom analysis and custom report which all has to be programmed. The results are populated into the reporting system and the outputted report is then quality controlled, trouble-shot, modified and the like. These result in a feedback which again has to be implemented by programming. Such cycles or iterative loops typically cause a considerable effort and, thus, high costs and time consumption. For example, in such clinical studies, very often large complex table with many rows and columns, each row with different attributes of patient characteristics like age, sex, blood pressure, diagnosis, while each column with different patient groups and subgroups, and with several row of headers, etc. Current technology used to build the whole such table in SAS, wasting a lot of time programming only the table layout. A version of SAS software installed in personal computer has the Dynamic Data Exchange (DDE) functionality to establish a real time link between SAS and Microsoft Excel®, so that to make data injected into the Excel cells easily without programming of the complex table layout. However, this technique is not applicable to other versions of SAS software that run the SAS grid computing platform on a central server. Also, this technique is not applicable to Microsoft® Word files, which are frequently required to be generated to present complex tables for regulatory submissions. Further, it's quite often necessary to depict the same results in both Microsoft Excel® and Microsoft® Word formats, and each with a different layout, e.g. switch the location of row attributes. The situation may get even worse if plural data sources hosted by different computing platforms are involved, each using different data analysis software and reporting process, and multiple report file types are to be produced for the same results.

SUMMARY

Therefore, there is a need for a system allowing an efficient technical workflow on generating the ERP from result values derived in at least one computing platform. Preferably, less programming efforts on generating complex table layouts is desired. Preferably, generating ERP in Microsoft® Word format is easier. And further, if possible, unify the workflows across different computing platforms and ERP formats.

According to the invention this need is settled by a computer implemented method as it is defined by the features disclosed below.

Referencing Method/System for Position Localization

In one aspect, the present invention is a computer implemented method for generating a Electronic Report Presentation ("ERP") from result values using a specific technical location pointer referencing system, comprising: (i) receiving a ERP template dataset, wherein the ERP template dataset is defining the format and structure of the ERP to be generated on a computing device and with placeholder locations for depicting the result values, (ii) automatically generating one or more technical interface dataset being a specific technical data structure including a number of records, wherein at least one of the number of records comprises a specific technical location pointer, being a computer recognizable functional parameter comprising at least two parts to localize where at least one of the result values is to be depicted in the ERP, and wherein each of the number of records comprises one result value coupled to the specific technical location pointer; and (iii) automatically retrieving the records of the technical interface dataset and feeding the result values into the ERP in accordance with the ERP template dataset using the specific technical location pointers, wherein the result values can be fed directly into the ERP template dataset, and wherein this step is performed by a particular ERP engine.

The term "technical location pointer" can indicate a generic location of the template dataset or a tag to a label located in the template dataset. An example of a generic location can be a binary position in a file or a combination of row and column of table, e.g. in Microsoft® Word, or the like. An example of a tag can be a reference to the pre-set in the file.

The invention considers a principle similar to how a computer uses indexes or location pointers to operate information in a numeric array dataset, and applies such a principle in a very specific setting, namely, to produce a dedicated ERP of Result Values derived from a set of pre-collected data. The method views the dedicated ERP as a "Presentation Array" dataset that contains a mixed combination of different presentation types (e.g. number, table, text paragraph, image, audio, video, or the like) at different locations to depict the derived Result Values. All the locations within the Presentation Array dataset can be indexed by some computer recognizable functional data or technical parameter of "Location Pointers" (e.g. file format intrinsic locations, table names/rows/columns, arbitrary labels of specific locations,), hence we can use such Location Pointers to determine the computer at which locations of the Presentation Array dataset to perform its tasks (e.g. search, read, write, and update information related to those locations, modify the color and fonts, or the like).

Considering how the computer hardware and operation system process byte signals to creating an electronic file, which involves applying a generic byte sequence referencing method/system, to refer the byte sequence (i.e. 000100111000 . . . ). Correspondingly, an operation system also usually provides a generic 1-dimensional character sequence referencing system. At a higher level, people create software applications with objects, like an Excel application to manage spreadsheets in a XLS file, a Microsoft® Word application to manage different tables in a DOC file, wherein a 2-dimensional or 3-dimensional human readable cell item referencing system are used respectively. Such "item" sequence referencing systems are based on rules with unique numbering, has unique number assigned to each item. On the other hand, the Operation System and software applications may also provide "string search" referencing system following a different rule, allowing repeated locations with the same string.

While the "item sequence" referencing systems are usually not inter-operable with the "string search" referencing systems, the different software usually have multiple referencing systems following different rules. For example, generating an Excel file adds a xls file-specific cell sequence referencing system (sheet name, row, col, used 2- or 3-dimensionally), a generic character sequence referencing system, and a string search referencing system for text items. Generating a blank Word file, has no such cell referencing system, but adds a generic character sequence referencing system and a string search referencing system. By adding a table to a blank Word file, further adds a doc file-specific cell referencing system (row, cell).

Adding a Location tag into a cell, further Adds a special string (inter-operable multi-dimensional) referencing system (our Location Pointer, referred as "LP", like: T1|2|3). —not mandated to be used in Excel, but must be used with the calls & interface, dataset.

Adding a Location tag into a Table, further Adds a special string (inter-operable multi-dimensional) referencing system (our Location Pointer, T1|2|3). —not mandated to be used in Word, but must be used with the calls & interface dataset.

This special string (inter-operable multi-dimensional) referencing system of our invention can be interpreted and used in different app-specific cell/other referencing systems, or in the generic string referencing system (string search).

Creating ERP cognitive content template needs human interaction, creating analysis calls needs human interaction, deriving new LP needs human interaction, a new programmable app-level/app-specific referencing system must be human readable, like cell/variable/other referencing systems—new LP must contain numbers and characters/strings so that usable, but can be encrypted/transformed in use/storage. <specific structure/label>, optionally with <seq number>.

After human manual programming workflow is established, the referencing system can be further automated and encrypted.

This invention as well, complex 2-dimensional tables are the key pain points→LP must have most generic structure/substructure (row/col), further additional parts for additional structure types/levels/dimensions.

In this way, this NEW special string referencing system can be used as 1-dimensional (string), 2-dimensional (table cell), 3-dimensional (multiple tables & cells) and inter-operable across different referencing systems, may have both unique locations and repeatable locations according to the final app-specific referencing system used. In the target app/file, multiple referencing systems can be used together, e.g. in Word file, string search+table cell referencing.

Preferably, the Location Pointer is human readable. The same tag may appear at multiple locations of the template dataset and/or multiple template datasets, which allows calculating the Result Value for only once but depicting the same Result Value multiple times under different sections and contexts of the same report or different reports. While this Location Pointer is designed in a format automatically generatable in accordance with the ERP template structure, this makes it very easy to be used for Complex tables in Microsoft® Word files comprising merged cells.

In one embodiment, wherein the specific technical location pointer is defined and used following at least one specific rule predefined in the ERP engine comprising the first part being used to identify a specific structure within the ERP, and the second part being used to identify a specific substructure within the ERP, and wherein depending on the at least one specific rule, localizing the result values within the ERP is either before, in, after, or by replacing the substructure identified with the second part of the technical location pointer.

In one embodiment, wherein the specific technical location pointer is designed in a unified format comprising at least two different formats, wherein each format of the at least two different formats is defined and used following at least one specific rule predefined in at least one software, wherein the unified format is applicable in at least two different software, and wherein, preferably, the unified format is a human readable string comprising three parts, and two parts of the three parts comprise numeric characters.

In one embodiment, further comprising generating the ERP template dataset using at least one ERP software via a graphical user interface structure, wherein at least one ERP template structure comprising pre-populated content and a number of placeholders where the result values are to be depicted is created and saved in the ERP template dataset, wherein the at least one ERP template structure comprises a number of computer recognizable data parameters, including but not limited to functional parameters and meta parameters.

In one embodiment, wherein the result values are derived from data pre-collected in at least one computing platform, further comprising: (i) pre-configuring the at least one computing platform such that a set of predefined functions comprising generic functions of the computing platform is accessible in the at least one computing platform; (ii) providing a set of calls directed to a set of predefined functions, wherein each call of the set of calls comprises a function identifier associated to one of the predefined functions, one or more pre-collected data parameters and one specific technical location pointer; and (iii) the predefined functions deriving the result values from the pre-collected data, coupling the result values to the specific technical location pointers, and saving the records into the technical interface dataset.

In one embodiment, wherein the particular ERP engine is a specific software configured to automatically feed the records of the technical interface dataset into the ERP, wherein the ERP engine is further configured to evaluate the technical interface dataset and to adapt the format of the ERP in accordance with the evaluated technical interface dataset, and/or wherein the ERP engine is further configured to insert additional data parameter into the ERP at locations in accordance with the evaluated technical interface dataset, and/or wherein the ERP engine is further configured to modify the technical interface dataset, including but not limited to edit, copy, and delete, and/or wherein the ERP engine is further configured to modify the ERP template dataset, including but not limited to automatically generate the specific technical location pointers for the placeholders in accordance with the ERP template dataset.

In one embodiment, it is a computer program comprising instructions which, when the program is executed in a computing environment, cause the computing environment to carry out the method.

In one embodiment, it is a physical computing environment for producing a dedicated ERP of result values derived from data pre-collected in at least one computing platform, comprising a processor structure, a data storage structure and a user interface structure, wherein the physical computing environment is configured to execute the computer implemented method.

ERP Generation Method/System

In one aspect, the invention is for producing a dedicated Electronic Report Presentation ("ERP") of result values derived from data pre-collected in at least one computing platform, comprising: (i) providing a set of calls directed to predefined functions accessible in the at least one computing platform, wherein each call of the set of calls comprises a function identifier associated to one of the predefined functions, one or more pre-collected data parameters and one specific technical location pointer, wherein the specific technical location pointer is a computer recognizable functional parameter comprising at least two parts to localize where at least one of the result values is to be depicted in the dedicated ERP; (ii) the predefined functions deriving the result values from the pre-collected data and coupling the result values to the specific technical location pointers; (iii) automatically generating one or more technical interface dataset being a specific technical data structure including a number of output records for each call of the set of calls, wherein at least one of the number of output records of each call of the set of calls comprises the technical location pointer, and wherein each of the number of records of the same call comprises one of the result values coupled to the specific technical location pointer by the associated predefined function; and (iv) automatically retrieving the records of the technical interface dataset and feeding the result values into the dedicated ERP in accordance with the predefined ERP format and structure using the specific technical location pointers, wherein the result values can be fed directly into the ERP template dataset, and wherein this step is performed by a particular ERP engine.

The steps of the method according to the invention can be performed in the order or sequence (i) to (v) listed above or in any other appropriate order or sequence. Hence, the numbering (i) to (v) is not to be understood that the respective steps have to be performed in this specific sequence but can also be performed in another sequence. Moreover, at least some of the listed steps can also be performed partially or fully in parallel or at the same time.

The term "dedicated ERP" as used in connection with the invention relates to a report specified or created for a particular set of Result Values or for a specific situation such as a specific clinical study or the like. Such report can be customized or designed exactly for the involved pre-collected data of a study or the like.

The method further comprises a step of generating the ERP template dataset using at least one ERP software via a graphical user interface structure, wherein at least one ERP template structure comprising pre-populated content and a number of placeholders where the result values are to be depicted is created and saved in the ERP template dataset, wherein the at least one ERP template structure comprises a number of computer recognizable data parameters.

The term "pre-collected data" or its synonym "data pre-collected" relates to data that has been collected at least to a wide extent before the specific reporting in accordance with the method according to the invention. Thereby, the pre-collected data can be raw data gathered in any context such as in a clinical study or the like. Further, the pre-collected data can be such raw data which has undergone conditioning, cleaning and/or pre-processing. For example, the pre-collected data can be data of a clinical study which has been pre-processed by restructuring, removing obviously wrong items and the like.

As described in more detail below, the Result Values can be derived from the pre-collected data, which is accessible on the at least one computing platform, by simply collecting or by further processing it. Further processing the pre-collected data may include applying an algorithm or calculation or generating a graphical representation or the like. For example, such further processing may be calculating a mean of a specific dataset gathered for a group of persons involved in a clinical study.

Thus, such derivation of the Result Values by the predefined functions may include simply forwarding an input value set in the respective call as output value. In such an embodiment the input value may be the value parameter and the output value the Result Value, wherein value parameter and the Result Value may be identical. Further, derivation may include calculation and/or transformation of the input value to generate the output value being different from the input value. In such embodiment, the input value may be identical to the value parameter and the calculated and/or transformed output value may be the Result Value. Still further, derivation may involve requesting or retrieving a data item from a data base or the like. The retrieved data item may then be calculated and/or transformed before being provided as output value, or be straightly forwarded as output value. In such embodiment, the value parameter may be or comprise a link to the specific data item in the database. The derivation may also involve any combination of the above.

When a string Location Pointer comprising three parts, with two parts to host row and column number, and a third part to host table name, the row and column number can be used to generate further Location Pointers for additional result values generated, via the set of calls and the predefined functions. For example, a predefined function product a result value using Location Pointer "T2|3|5" (Table-|row|column), if the predefined function produce a second result value, we can increase the row number by one, then the new Location Pointer will be "T2|4|5".

The term "data" as used herein generally relates to digital information provided in a predefined format. It can be a digital bit stream or the like which represents physical and/or logical conditions and changes or the like. It can particularly be in a format accessible and evaluable by a computing environment such as the computing platform thereof. Thereby, depending on the given context or need, data can be provided in the form of an electric signal or a data signal, which can be transferred and interpreted in accordance with the predefined format. Or it can be provided as a structure in an appropriate medium such as hard disk or the like.

The term "computer recognizable functional parameters" herein relates to functional instructions that used to instruct a computing device to perform operations like calculating a mean, modifying or deleting a string. While the term "computer recognizable data parameters" herein includes the above "functional parameters" and further includes metadata or meta parameters, and other data parameters. The metadata or meta parameters are usually used to describe the content data, for example, controlling the appearance of the result values including but not limited to color, font, size, or the like.

The term "signal" herein can relate to a measurable or determinable physical quantity or unit or a sequence of such quantities or units, which is configured to represent an information or data. Particularly, a signal can be an electric voltage or potential, an acoustic pressure, an electromagnetic wave, a field force, a sequence or any combination thereof, which can be physically transferred over a point-to-point or point-to-multipoint communication channel. Such channels may be copper wires, optical fibers, wireless communication channels, storage media and computer buses. In any case, signals or data signal are recordable or conceivable and distinctly determinable. Data signals can be binary data signals, digital electronic signals, electromagnetic signals or combinations thereof. They can represent specific data particularly organized in accordance with a specific protocol.

The term "represent" in connection with signals or data signals can relate to a presence of an information. Such information may be or comprise simulation information such as parameters allowing simulation. Thereby, this term does not exclude that aside of the explicitly mentioned information also other information is comprised in the signal or data signal. For example, a data signal can represent an information by being conditioned in a specific manner, such that the information can be recollected or determined from the data signal.

The term "ERP engine" herein relate to a particular software created by the invention, which can be a set of standalone software, a set of modules integrated to another software, a further configured functionalities of existing software, or a mix of above. The ERP engine is configured to automatically feed the records of the technical interface dataset into the dedicated ERP. In addition, the ERP engine can be configured to evaluate the technical interface dataset and to adapt the format of the dedicated ERP in accordance with the evaluated technical interface dataset. In addition, the ERP engine can be configured to insert additional data parameter into the dedicated ERP at locations in accordance with the evaluated technical interface dataset. In addition, the ERP engine can be configured to modify the technical interface dataset, including but not limited to edit, copy, and delete. In addition, the ERP engine can be configured to modify the ERP template dataset, including but not limited to automatically generate the specific technical location pointers for the placeholders in accordance with the ERP template dataset The term "ERP Template Dataset" in the context of the invention relates to a set of data representing a format or form of a report to be created. It can generally be any data structure which is suitable to be used as template for the dedicated report to be created. For example, the ERP Template Dataset can be a template file in which a layout of a report is defined. Thereby, such template file can comprise rich formatting design and/or some contents being pre-populated. For example, the ERP Template Dataset can be any file of a standard reporting tool such as a Microsoft Excel® file, a Microsoft PowerPoint® file, a Microsoft® Word file, or a Portable Document Format (PDF) file. Also, the ERP Template Dataset can be implemented in a database such as a database managed by a database management system (DBMS) software.

Such functionalities have to be implemented via a new type of functional data structure handling system customized for the Location Pointers of the ERP, like that set out by the present invention. Likewise, the technical Interface Dataset can be any data structure which is suitable to be automatically handled. For example, the technical Interface Dataset can be implemented as a table or records in a database or in a cache memory. As described in more detail below, in an advantageous embodiment the technical Interface Dataset is an interface file.

The format of the dedicated report may include positions of images, table, texts, numbers and the like, as well as colors, font definitions and the like, and file type.

The term "interface" as used herein can be a shared boundary across which two or more separate components exchange data or information. The exchange can be between software, hardware, peripheral devices, humans and combinations of these. Some interfaces can both send and receive data, while others may only send data to a component. A user interface (UI) can be a space where an interaction between humans such as a user or operator and machines such as the computer executing the method occur. Generally, user interfaces may be composed of one or more layers including a human-machine interface (HMI) interface machine with physical input hardware such a keyboard, a mouse and/or a game pad, and output hardware such as a monitor, a speaker and/or a printer.

The term "platform" as used herein relates to a computing platform or digital platform being the environment in which a piece of software or computer program is executed. It involves hardware components such as at least one computing device usually equipped with an operating system (OS), runtime libraries and the like. Thereby, the platform provides physical and logical components required for executing the software. In a nutshell, a platform is the stage on which programs or software runs.

The at least one computing platform is arranged to analyze and evaluate raw data. In particular, it typically involves a dedicated software such as SAS, R, Python, SQL, Matlab, Scala, STADA, Java, Visual Basic, C, or the like. This software may provide predefined functions accessible to the calls. It further may allow to predefine custom functions by means of a programming language, a macro language or another scripting facility.

The pre-collected data parameter may include a data source parameter such as information about the database to gather the data and/or a table name, or the like. It may also include a number or string or the like.

The number of records may be one or more. Thus, the predefined function may provide one single record or a plurality of records. In case a plurality of records is provided, at least one of these records has to include the Location Pointer set in the respective call.

Generating the technical Interface Dataset automatically can relate to the predefined functions providing the technical Interface Dataset, e.g. in a target database or in a target file system or the like. The automatic feeding of the records into the dedicated report can be triggered automatically or manually, e.g., by a user simply clicking a button or the like. When or before feeding the records, the ERP Template Dataset may be automatically or dynamically adapted to comply to the technical Interface Dataset. For example, before feeding the records the number of records can be evaluated and the respective sizes of the locations where the records are to be positioned can be adapted in order that the ERP Template Dataset suits the specific technical Interface Dataset.

By providing the set of calls in the method according to the invention, the setting up of the dedicated report can be particularly efficient and, compared to known reporting, allows the essentially decrease complexity and effort for setting up reports. In more figurative words, the calls of the set of calls may referred to as bricks, Lego bricks or code bricks which can be put together for building the dedicated report. With such (code) bricks system, more flexibility to modify the report layout and/or planned analysis can be provided as well as it can be easier and faster to experiment the report, perform quality control and debug.

The method according to the invention allows for a comparably efficient workflow for generating dedicated reports. In particular, the analysis or programming logic can be separated from the report formatting. It can be prevented that the dedicated report or its format/design iteratively has to be created in the analysis software involving a plurality of cycles of coding. By providing the predefined functions it can be achieved that specific data analysis can be done while setting up the output to the technical Interface Dataset, and the Result Values are only coupled to the report layout locations via the set of calls. Like this, complexity of the analysis programming and the report programming, as well as manual editing effort can be reduced. This allows the user to better focus on the programming for complex analysis and spend smaller effort on reporting.

Preferably, the at least one computing platform comprises a platform computing device having a platform data processor, a platform data storage and a platform user interface unit, wherein the platform computing device executes a data analysis software for analyzing the pre-collected data and preferably a database software for managing the pre-collected data.

The term "computing device" as used herein can relate to a computer being any suitable apparatus such as a laptop computer, a desktop computer, a server computer, a tablet, a smartphone, an embedded computer system or the like. The term covers single devices as well as combined devices. A computer can, for example, be a distributed system, such as a cloud solution, performing different tasks at different locations.

Generally, a computer typically involves a processor or central processing unit (CPU), a permanent data storage having a recording media such as a hard disk, a flash memory or the like, a random access memory (RAM), a read only memory (ROM), a communication adapter such as an universal serial bus (USB) adapter, a local area network (LAN) adapter, a wireless LAN (WLAN) adapter, a Bluetooth adapter or the like, and a physical user interface such as a keyboard, a mouse, a touch screen, a screen, a microphone, a speaker or the like. Computers can be embodied with a broad variety of components.

The platform computing device can be a computer configured to implement the platform. Thereby, it specifically, executed the database software such as a database management system (DBMS) or a portion thereof, and the data analysis software such as SAS, R, Python, SQL, Matlab, Scala, STADA, Java, Visual Basic, C, or the like. Managing data may involve storing or saving the data in the platform data storage, searching the stored data and accessing the stored data.

The predefined functions accessible in the at least one computing platform can be or comprise functions implemented in the data analysis software or data evaluation software run on the at least on the at least one computing platform. For example, the predefined functions may include standard functions of the data analysis software executed on the at least one computing platform for general data evaluation. However, preferably, the computer implemented method comprises a step of configuring the at least one computing platform such that the predefined functions comprise specific functions made accessible in the data analysis software. Such specific functions may particularly be suitable to provide the technical Interface Dataset. Also, they allow for applying dedicated calculations like established customized statistical methods and to provide respective dedicated results. Further, such predefined functions may involve a combination of plural standard functions to be applied at once. Still further, in case plural computing platforms executing different analysis software are involved, such specific functions allow for providing a uniform syntax over the different platforms for reporting. Like this, the complexity of the reporting can be essentially lowered, and it enables a user to switch between different computing platforms and/or programming languages easily.

Preferably, the set of calls directed to the predefined functions is provided in the data analysis software. Such implementation directly in the data analysis software allows for using the programming language and functions provided in the data analysis software. Like this, an efficient implementation is possible.

Preferably, all steps of the method according to invention are implemented or executed in a physical computing environment comprising the platform computing device, wherein the physical computing environment has a processor structure comprising the platform data processor of the platform computing device, a data storage structure comprising the platform data storage of the platform computing device and a user interface structure comprising the platform user interface unit of the platform computing device. Besides the platform computing device, the physical computing environment can involve additional computing devices such as one or more further platform computing devices, a reporting computing device or the like. Thereby, the processor structure, the data storage structure and the user interface structure can comprise the data processor(s), the data storage(s) and the user interface(s) of the respective additional computing device(s).

More specifically, the physical computing environment preferably comprises a reporting computing device having a reporting data processor, a reporting data storage and a reporting user interface unit, wherein the processor structure of the physical computing environment comprises the reporting data processor of the reporting computing device, the data storage structure of the physical computing environment comprises the reporting data storage of the reporting computing device, the user interface structure of the physical computing arrangement comprises the reporting user interface unit of the reporting computing device, and the reporting computing device executes a reporting software.

The reporting software may be or include any standard computer program or software suitable for reporting. Thereby, such reporting software may be an office software such as a word processor like Microsoft® Word, a spreadsheet like Microsoft Excel® or a presentation program like Microsoft PowerPoint®, or a general-purpose programming software that can handle reporting such as R, Python or the like.

Thereby, the ERP Template Dataset preferably is generated in the reporting software executed by the reporting computing device via the user interface unit of the reporting computing device. The reporting software can provide a macro language or similar scripting structure by which the reporting can be automatized or customized. For example, the reporting software may be or involve Microsoft® Word which provides Visual Basic for Applications (VBA) as macro language. The ERP Template Dataset can also be dynamically handled such as by, before feeding the records, evaluating the number of records and adapting the respective sizes of the locations where the records are to be positioned in order that the ERP Template Dataset suits the specific technical Interface Dataset.

The computer implemented invention preferably comprises a step of configuring the reporting software executed by the reporting computing device to automatically feed the records of the technical Interface Dataset into the report. It also preferably comprises a step of configuring the reporting software executed by the reporting computing device to evaluate the technical Interface Dataset and to adapt the format of the dedicated report in accordance with the evaluated technical Interface Dataset. Such configuration allows for a particularly efficient implementation of the computer implemented method.

Feeding the records of the technical Interface Dataset preferably comprises identifying the location of each of the number of records, e.g. by means of the respective Location Pointer, identifying the corresponding Location Pointer of each of the number of records, and positioning the Result Value associated to each of the number of records into the report. The automation of steps (iii) to (v) for the reporting can prevent human introduced errors that happen during an at least partially manual process.

The physical computing environment preferably is configured to set-up the predefined functions accessible in the at least one computing platform via the user interface structure, and to save the set-up predefined functions in the data storage structure.

Preferably, the physical computing environment is configured to provide the set of calls by inputting each call of the set of calls via the user interface structure, and saving the set of calls in the data storage structure. Thereby, the physical computing environment preferably is configured to provide a graphical user interface of the user interface structure, to display graphical items representing the calls of the set of calls in the graphical user interface, and to input each call of the set of calls by drag and drop the graphical items displayed in the graphical user interface. In addition to the drag and drop action the user interface can receive further information, such as a manual user input string, related to the respective call. Such drag and drop provision of the items representing calls allows for implementing the method of the invention in a particularly convenient manner. Moreover, it can be achieved that comparably low knowledge and training is required for setting up the calls.

With overall method, low knowledge/training can be achieved for the users, e.g. they don't need to know or be trained on how to program a Word report document with paragraph of text, complex tables, complex formatting and layouts in an analysis software, but can produce such complex document from scratch on his own using this method—without the technical knowledge/training and technical infrastructure/dedicated server/software to /// setup active links between the document and the result values // a replacement of dashboard technology. /// allow automatic and flexible assignment of a Location Pointer to a particular location in the ERI, not like dashboard it will be fixed Thereby, the graphical user interface preferably is configured to display the dedicated report, to receive an update command, to adapt the ERP Template Dataset in accordance with the update command and to perform steps (ii) to (v) of the computer implemented method described above using the adapted ERP Template Dataset. Such configuration allows for efficiently and conveniently adapting and customizing the dedicated report. Also, it allows for replacing data displayed in the dedicated report. In both, no coding is required as all necessary actions are provided on a graphical basis in the graphical user interface.

Preferably, the physical computing environment is configured such that generating the technical Interface Dataset comprises saving an interface file, e.g., as a plain text file in the data storage structure. The interface file can be saved in the platform data storage of the platform computing device or in any other data storage of the data storage structure. For example, the interface file can be stored in a network attached storage (NAS) of network to which the platform computing device is connected. Or the interface file can be stored on a server data storage accessible via the internet. The text file can be arranged to allow efficiently deriving the stored records. For example, the text file can be embodied a character separated value (CSV) file. Moreover, the text file can be stored in a file system of the of the data storage structure. In addition, almost any analysis software can write Result Values directly into such text file, and the same Result Values in such text file can be retrieved by any reporting software and fed into different report file types with different layouts, thus allowing a plurality of diverse analysis software, reporting software, computing platforms, established team workflows, and/or report file types to be compatible with each other within the framework set out by the current invention. This may allow for boosting productivity and collaborations, e.g. federated clinical studies.

Still further, the use of technical Interface Dataset allows spatially decoupling the analysis activities from the reporting activities, like using a dedicated grid computing SAS server for analysis and user laptops at different places for reporting, and temporally, like near real time final report generation immediately after analysis or federated result collection from multiple teams for later final report generation. It also allows collaboration between computing devices over a low speed and big-time lag network connection.

Alternatively or additionally, the physical computing environment executes a database software and is configured such that generating the technical Interface Dataset comprises the database software storing and managing the technical Interface Dataset. For example, the technical Interface Dataset can be stored in a specific table or table set predefined in the database. Such database implementation of the technical Interface Dataset may allow for a fast and sophisticated handling or retrieval of the Result Values and Location Pointers and other functional data of the technical Interface Dataset.

Preferably, the physical computing environment is configured such that generating the technical Interface Dataset comprises generating either at least one delimited string or one image per record. It may also comprise generating one line in the technical Interface Dataset per record. Such structure of the technical Interface Dataset allows for an efficient processing of the technical Interface Dataset and, particularly, its content.

Preferably, the physical computing environment is configured such that functions called by the calls of the set of calls and particularly the predefined functions called by the calls of the set of calls generate the technical Interface Dataset. Like this, the predefined functions can directly generate and/or augment the technical Interface Dataset which allows for an efficient generation thereof.

Preferably, at least one of the calls of the set of calls comprises a calculation command. For example, the calculation command can be provided by the analysis software. Like this, the Result Values can efficiently be calculated or created, i.e. derived.

Preferably, the Result Value of at least one of the number of records of at least one call of the set of calls provided by the associated function comprises a graphical representation. Such graphical representation can be an image created by the analysis software or another program executed by the computing platform. Or it can be an image selected on the basis of the pre-collected data. For example, such image may be a symbolic image for indicating a status or condition of the pre-collected data or Result Value(s).

Thereby, the technical Interface Dataset preferably comprises an image file depicting the graphical representation, wherein the associated Location Pointer is integrated in the name of the image file. The image file can particularly be an image file which can be integrated by the reporting software. For example, the image file can be a file in a predefined format such as a tagged image file (TIF) or a joint photographic experts group file (JPEG).

By integrating the Location Pointer into the name of the image file, the location of the image in the dedicated report can efficiently be provided to the reporting software. Like this, the image file can be fed to the dedicated report at its foreseen location.

Preferably, the physical computing environment is configured to provide the set of calls by automatically inputting each call of the set of calls with information from the ERP Template Dataset, and saving the set of calls in the data storage structure.

In another aspect, the invention is a computer program comprising instructions which, when the program is executed in a computing environment, cause the computing environment to carry out the method of any one of the preceding claims.

The computer program can be a computer program product comprising computer code means configured to control a processor of a computer to implement the computer implemented method or any of its preferred embodiments described above or below when being executed on the computer. Further, there can be provided a computer readable medium comprising instructions which, when executed by a computer, cause the computer to carry out the method or any of its preferred embodiments described above or below. The medium can a storage medium and, for allowing a convenient distribution, a mobile or portable storage medium. Or, for allowing a transfer over the Internet or the like, or for other purposes, there can be provided a data carrier signal carrying the computer program described herein before. The computer program can also be referred to as or comprised by a software.

The computer program according to the invention allows for efficiently implementing the computer implemented method described above and, thereby, achieving the effects and benefits described above in connection with the computer implemented invention according to the invention and its preferred embodiments.

In a further other aspect, the invention is a physical computing environment for reporting of analysis Result Values derived from at least one computing platform, comprising a processor structure, a data storage structure and a user interface structure, wherein the physical computing environment is configured to generate a ERP Template Dataset defining a format of a report to be generated, wherein the ERP Template Dataset comprises Location Pointers to localize where the analysis Result Values is to be depicted in the report; to provide a set of calls directed to predefined functions accessible in the at least one computing platform, wherein each call of the set of calls comprises a function identifier associated to one of the predefined functions, a pre-collected data parameter and one of the Location Pointers; to automatically generate an technical Interface Dataset including a number of records for each call of the set of calls, wherein at least one of the number of records of each call of the set of calls comprises the Location Pointer and each of the number of records of the same call comprises a value provided by the associated function; and to automatically feed the records of the technical Interface Dataset into a dedicated report in accordance with the ERP Template Dataset using the Location Pointer.

By means of the physical computing environment according to the invention and its preferred embodiments described below the effects and benefits of the computer implemented invention and its preferred embodiments described above can efficiently be implemented.

Preferably, the physical computing environment comprises a platform computing device, wherein the processor structure has a platform data processor embodied in the platform computing device, the data storage structure has a platform data storage embodied in the platform computing device and the user interface structure has platform user interface unit embodied in the platform computing device, and the platform computing device executes a database software for managing data and a data analysis software for analyzing data managed by the database software.

Thereby, the platform computing device is configured such that the predefined functions comprise specific functions made accessible in the data analysis software. The platform computing device preferably is configured such that the set of calls directed to the predefined functions is provided in the data analysis software.

Preferably, the physical computing environment is configured to generate the ERP Template Dataset by receiving input data via the user interface structure, to determine the format of the data to be reported on the basis of the input data, and to save the ERP Template Dataset including the determined format into the data storage structure.

The physical computing environment preferably comprises a reporting computing device having a reporting data processor, a reporting data storage and a reporting user interface unit, wherein the processor structure of the physical computing environment comprises the reporting data processor of the reporting computing device, the data storage structure of the physical computing environment comprises the reporting data storage of the reporting computing device, the user interface structure of the physical computing arrangement comprises the reporting user interface unit of the reporting computing device, and the reporting computing device executes a reporting software.

Thereby, the reporting computing device preferably is configured to generate the ERP Template Dataset in the reporting software executed by the reporting computing device via the user interface unit of the reporting computing device.

The reporting computing device preferably is configured to automatically feed the records of the technical Interface Dataset into the dedicated report in the reporting software executed by the reporting computing device. Thereby, the reporting computing device preferably is configured to feed the records of the technical Interface Dataset by reading the technical Interface Dataset, identifying the Location Pointer of each of the number of records, identifying the corresponding Location Pointer of each of the number of records, and positioning the value associated to each of the number of records into the report.

Preferably, the physical computing environment is configured to set-up the predefined functions via the user interface structure, and to save the set-up predefined functions in the data storage structure.

Preferably, the physical computing environment is configured to provide the set of calls by inputting each call of the set of calls via the user interface structure, and saving the set of calls in the data storage structure. Thereby, the physical computing environment preferably is configured to provide a graphical user interface of the user interface structure, to display graphical items representing the calls of the set of calls in the graphical user interface, and to input each call of the set of calls by drag and drop the graphical items displayed in the graphical user interface.

The physical computing environment preferably is configured to generate the technical Interface Dataset by saving an interface file as a text file in the data storage structure.

The physical computing environment preferably is configured to generate the technical Interface Dataset by generating one line in the technical Interface Dataset per record.

The physical computing environment preferably is configured to generate the technical Interface Dataset by functions called by the calls of the set of calls.

Preferably, at least one of the calls of the set of calls comprises a calculation command.

Preferably, the value of at least one of the number of records of at least one call of the set of calls provided by the associated function comprises a graphical representation. Thereby, the technical Interface Dataset preferably comprises an image file depicting the graphical representation, wherein the associated Location Pointer is integrated in the name of the image file.

Further Effects and Benefits

With the current invention, using the specific technical location pointers and the methods to derive result values and generate ERP, it allows unique advantages. For the same set of result values, we may instruct the Microsoft Excel® to populate the result values into a worksheet based on the worksheet name and row and column number, while at the same time we can also simply put such string of Location Pointers within a table in Microsoft® Word file having a different layout to the Microsoft Excel® table beforehand, and later search the string of such Location Pointers within the Word file and replace the string of Location Pointer directly with the corresponding same result value. We can even put the same string Location Pointer within a text paragraph and a table of the Word file, so that the same result value can be populated both in a Word file table, a Word paragraph, and in a cell of Microsoft Excel®.

BRIEF DESCRIPTION OF THE DRAWINGS

The computer implemented method according to the invention, the physical computing environment according to the invention and the computer program according to the invention are described in more detail hereinbelow by way of an exemplary embodiment and with reference to the attached drawings.

DETAILED DESCRIPTION

In the following description certain terms are used for reasons of convenience and are not intended to limit the invention. The terms "right", "left", "up", "down", "under" and "above" refer to directions in the figures. The terminology comprises the explicitly mentioned terms as well as their derivations and terms with a similar meaning. Also, spatially relative terms, such as "beneath", "below", "lower", "above", "upper", "proximal", "distal", and the like, may be used to describe one element's or feature's relationship to another element or feature as illustrated in the figures. These spatially relative terms are intended to encompass different positions and orientations of the devices in use or operation in addition to the position and orientation shown in the figures. For example, if a device in the figures is turned over, elements described as "below" or "beneath" other elements or features would then be "above" or "over" the other elements or features. Thus, the exemplary term "below" can encompass both positions and orientations of above and below. The devices may be otherwise oriented (rotated 90 degrees or at other orientations), and the spatially relative descriptors used herein interpreted accordingly. Likewise, descriptions of movement along and around various axes include various special device positions and orientations.

To avoid repetition in the figures and the descriptions of the various aspects and illustrative embodiments, it should be understood that many features are common to many aspects and embodiments. Omission of an aspect from a description or figure does not imply that the aspect is missing from embodiments that incorporate that aspect. Instead, the aspect may have been omitted for clarity and to avoid prolix description. In this context, the following applies to the rest of this description: If, in order to clarify the drawings, a figure contains reference signs which are not explained in the directly associated part of the description, then it is referred to previous or following description sections. Further, for reason of lucidity, if in a drawing not all features of a part are provided with reference signs it is referred to other drawings showing the same part. Like numbers in two or more figures represent the same or similar elements.

Figure 1:
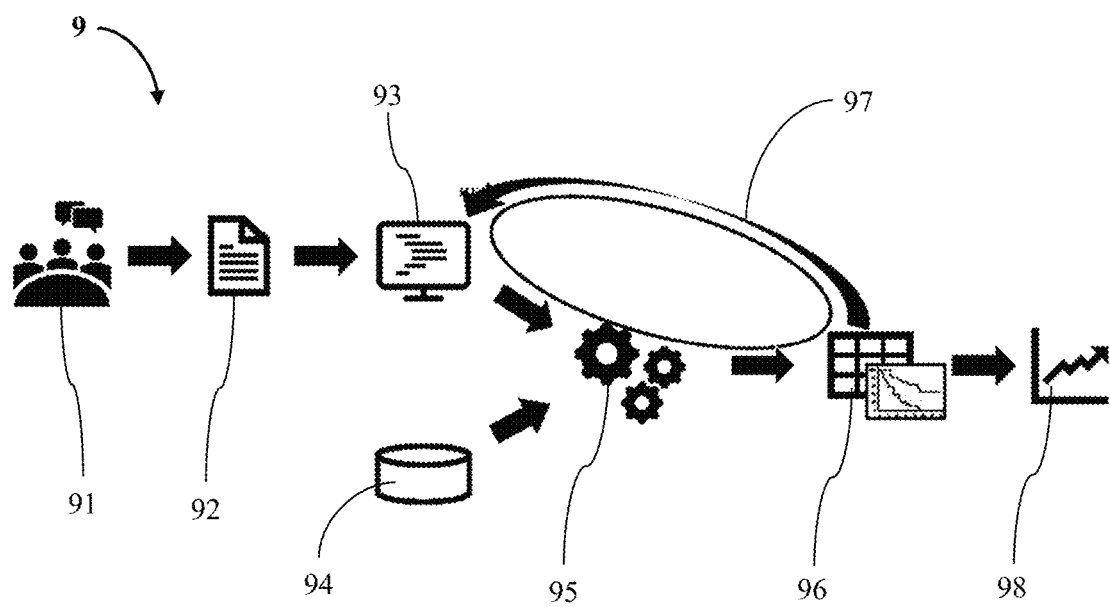
FIG. 1 shows a schematic view of a prior art reporting procedure.

FIG. 1 shows a reporting procedure as it is known in the art to be implemented in the context of clinical studies or clinical database studies. In a step 91 needs of a client, who desires one or more reports about data collected in one or more clinical studies, are gathered and defined. From these client needs, in a step 92 an analysis plan is developed. In the analysis plan it is defined how the collected or raw data is to be analyzed and reported. In a step 93, programming specialists program a computing environment to realize the analysis plan. The programming typically is done in an analysis software run be the computing environment. In particular, for such purposes the analysis software provides a programming or scripting language such as SAS, R, Python, SQL, or the like. Thereby, tables and figures are created, the collected data is cleaned and prepared, custom functions are performed to analyze the collected data, and the layout as well as the format of the dedicated report is set up.

After programming, in a step 95, the created program is executed. When being executed, the collected data which, in a step 94, is stored in a database, is retrieved, analyzed and formatted in accordance with the analysis plan. In a step 96, the analyzed data is then populated in a preliminary report. For example, this preliminary report can be a Microsoft Excel® file, a Microsoft PowerPoint® file, a Microsoft® Word file, or the like. The preliminary file is then, in a step 97, verified by a dedicated quality control, modified and debugged. The results from step 97 are provided to the programming.

Steps 93, 95, 96 and 97 are iteratively performed until the preliminary report created can be accepted as final report. In particular, this iterative process involves reprogramming and re-evaluating the preliminary reports, both of which may involve a comparably high effort and specific knowledge. At the end, in a step 98 a final report is generated as result of the reporting procedure.

Figure 2:
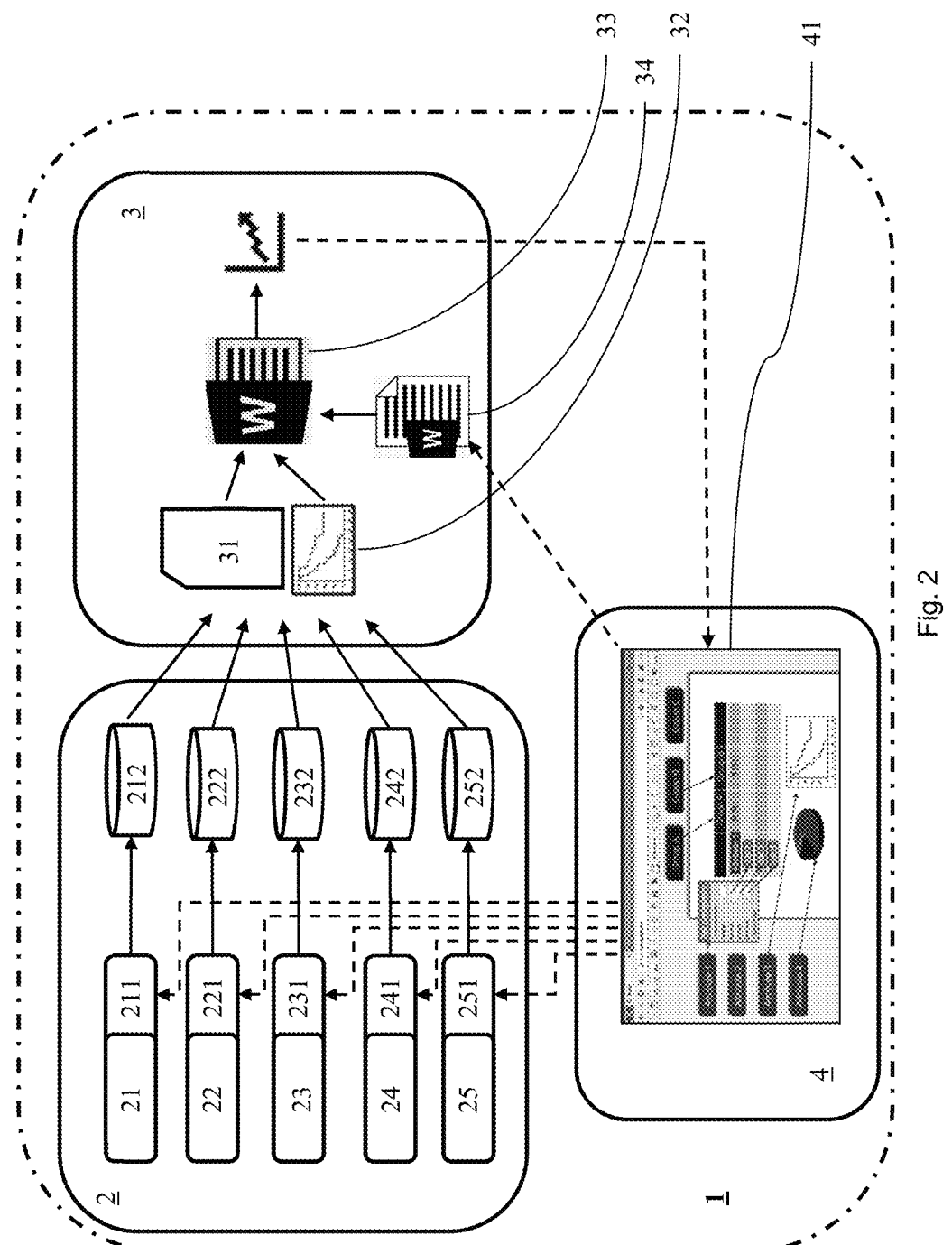
FIG. 2 shows a schematic view of a physical computing environment according to the invention executing a computer program according to the invention for implementing a computer implemented method according to the invention.
Figure 3:
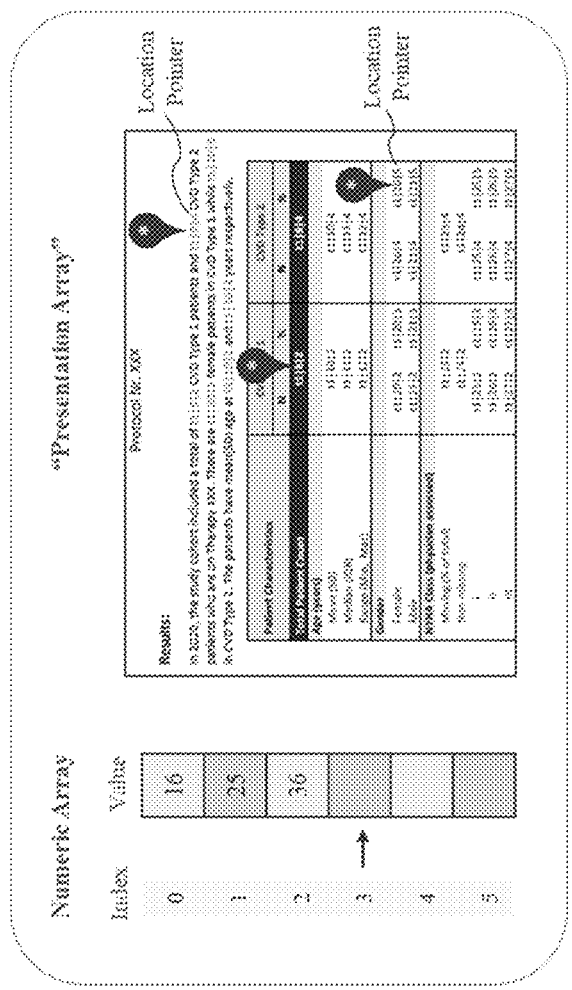
FIG. 3 shows a concept in designing the specific technical location pointers for the invention while considering the ERP as a "presentation array".
Figure 4:
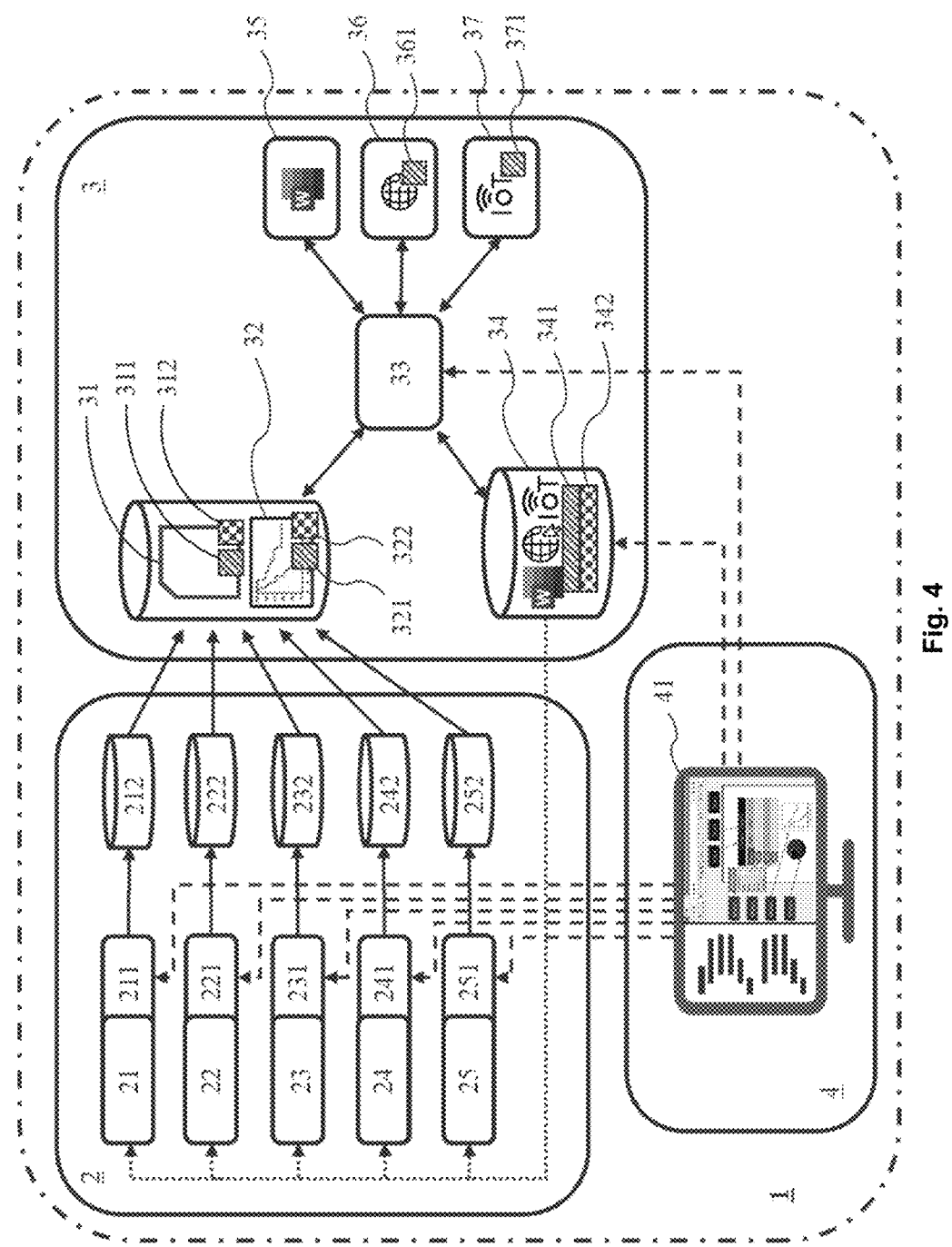
FIG. 4 shows another schematic view of a physical computing environment according to the invention executing a computer program according to the invention for implementing a computer implemented method according to the invention.
Figure 5:
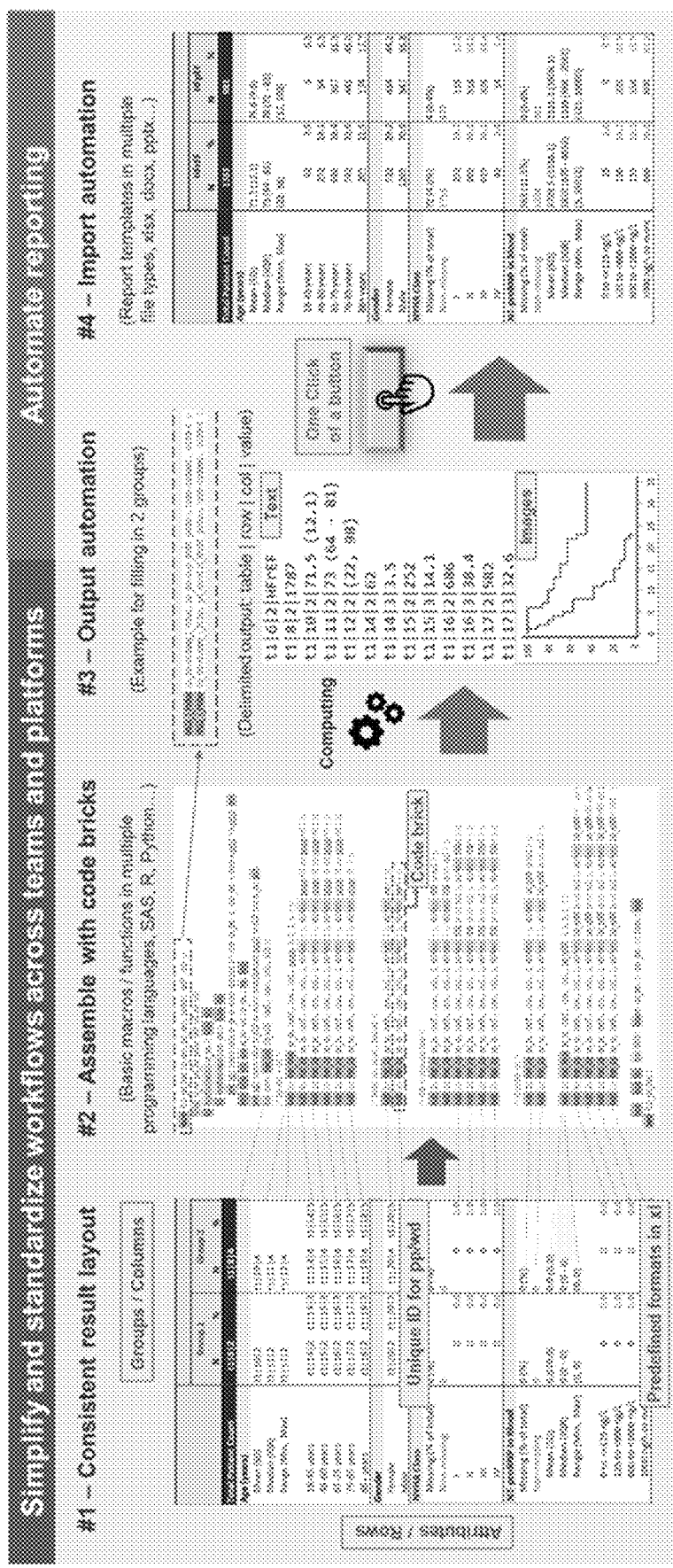
FIG. 5 shows an embodiment how the invention achieve the effect of generating complex table with result values but without programming the complex layout.
Figure 6:
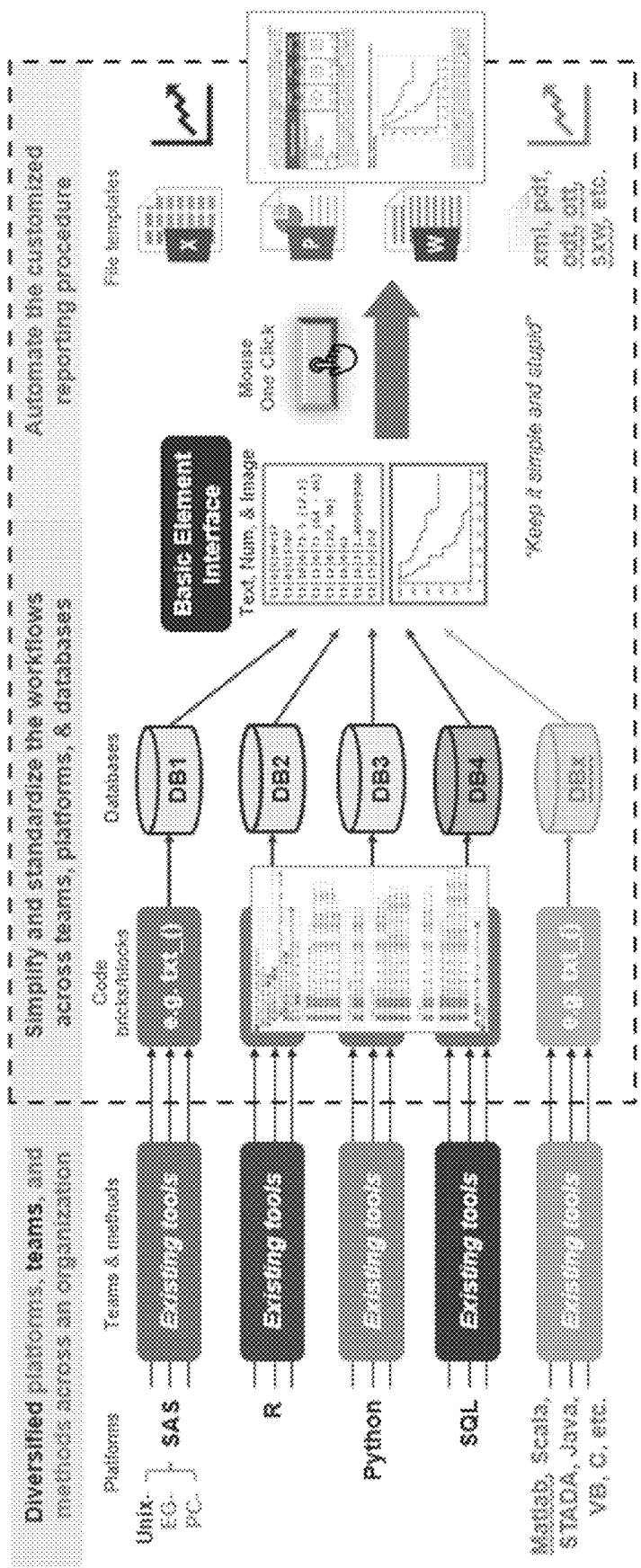
FIG. 6 shows an embodiment how the invention unify the different computing platform workflows and bridge the same system to different ERP application formats.

FIG. 2 shows an embodiment of a physical computing environment 1 according to the invention executing an embodiment of a computer program according to the invention thereby implementing an embodiment of a method according to the invention. The physical computing environment 1 comprises a computing environment 2, a reporting computing device 3 and a control computing device 4. The computing environment 2 has a first platform computing device 21, a second platform computing device 22, a third platform computing device 23, a fourth platform computing device 24 and a fifth platform computing device 25. The first platform computing device 21 runs SAS as first data analysis software and a first database management system providing a first database 212 in which raw data collected in a clinical study are stored. The second platform computing device 22 runs R as second data analysis software and a second database management system providing a second database 222 in which raw data collected in the clinical study are stored. The third platform computing device 23 runs Python as third data analysis software and a third database management system providing a third database 232 in which raw data collected in the clinical study are stored. The fourth platform computing device 24 runs SQL as fourth data analysis software and a fourth database management system providing a fourth database 242 in which raw data collected in the clinical study are stored. The fifth platform computing device 25 runs Matlab as fifth data analysis software and a fifth database management system providing a fifth database 252 in which raw data collected in the clinical study are stored.

In an initial preparation or pre-processing step, specific evaluation functions as predefined functions are programmed in SAS in the first platform computing device 21. The evaluation functions provide customized analysis and evaluation of the raw data for reporting purposes. For example, a specific evaluation function may include gathering data items associated to female participants of the study stored in the first database 212 and calculating a mean out of the gathered items. Corresponding evaluation functions are programmed in R in the second platform computing device 22, in Python in the third platform computing device 23, in SQL in the fourth platform computing device 24 and in Matlab in the fifth platform computing device. The result of application of the specific evaluation functions is data pre-collected in the first platform computing device 21.

The reporting computing device 3 runs Microsoft® Word 33. In a further preparation step, a template file 34 or a Microsoft® Word file (DOC file) is created as ERP Template Dataset in Microsoft® Word 33. The template file 34 defines a format of a dedicated report to be generated, wherein it comprises Location Pointers to localize where analysis Result Values is to be depicted in the dedicated report. The template file 34 is further provided with a feeding procedure programmed in VBA. The feeding procedure can be triggered via a specific button included in the template file 34. The template file 34 is stored in a file system of the reporting computing device 3.

On the control computing device 4 a control software is run. The control software package comprises a graphical user interface 41 allowing to define calls directed to evaluation functions accessible on the first to fifth platform computing devices 21, 22, 23, 24, 25. More specifically, the graphical user interface 41 allows for composing the calls by dragging and dropping graphical elements in the graphical user interface. Furthermore, the graphical user interface allows for gathering text user input. Like this, the calls can be composed to a set of calls, wherein each call can be regarded as a brick or Lego brick in the set of calls. In the following, the single calls are also referred to as code bricks.

Each code brick comprises a function identifier associated to one of the specific evaluation functions, a pre-collected data parameter and one of the Location Pointers of the template file 34. The control software applies a number of first code bricks 211 to the first platform computing device 21. The first code bricks 211 execute the associated evaluation functions with the respective pre-collected data parameters and Location Pointers. The evaluation functions executed by the respective first code bricks 211 on the first platform computing device 21 collect the required raw data from the first database 212 and write at least one record in an interface file 31 as technical Interface Dataset on the reporting computing device 3. The at least one record comprises the Location Pointer of the respective code brick and a Result Value calculated, collected or collected and calculated by the executed specific evaluation function. Analogously, a number of second code bricks 221 are applied to the second platform computing device 22, a number of third code bricks 231 are applied to the third platform computing device 23, a number of fourth code bricks 241 are applied to the fourth platform computing device 24, and a number of fifth code bricks 251 are applied to the fifth platform computing device 25.

At the end, the interface file 31 comprises records provided by the specific evaluation functions executed by the first to fifth code bricks 211, 221, 231, 241, 251. The interface file is organized as character separated value (CSV) file, wherein each record is written in a new line of the file.

In addition to the interface file 31, some of the specific evaluation functions may provide a graphical image 32 such as a chart or the like. The respective evaluation function stores the created graphical image in the file system of the reporting computing device 3 and provides the Location Pointer of the respective code brick in the name of the graphical image, i.e. the image file name.

For creating the dedicated report, the template file 34 is opened in Microsoft® Word 33 on the reporting computing device 3 which creates an instance of a report Microsoft® Word document file (DOC file). By clicking on the specific button, i.e. a VBA macro button, of the DOC file, the feeding procedure is executed. Thereby, the records of the interface file 31 are gathered, wherein the Result Value of each record is filled into the dedicated report at the location associated to the respective Location Pointer. Correspondingly, the graphical images 32 are imported and positioned in accordance with their Location Pointers stored in the file names. Thus, by clicking on the specific button the dedicated report is automatically fed and created. The dedicated report or a copy thereof can then be transferred to the control computing device 4. There it can be displayed in the graphical user interface 41, where, as the need may be, it can be adapted. In particular, after adaptation in the graphical user interface 41, the process can be reiterated such that a new dedicated report is generated.

In a set of preferred embodiments, we first design the table with groups in the columns and attributes in the rows (or vice versa, in a consistent manner). Then in programming, we use a set of basic macros or functions (in different data processing software like SAS, R, Python, SQL, or varied computing platforms like SAS in a central server vs. SAS in a personal computer) to calculate individual customized analysis results (N, %, mean, p-values, categories, strings, graphs, and so on), and place the results at the exact location of the report templates (in Excel, Word, PowerPoint, pdf, odt, ot, sxw, or any other report file formats) defined by table tags and location tags (e.g. table acronyms, row and column numbers). The value results are first calculated and output to a plain text file (txt, csv, dat, or any other plain text file format) in any delimited format (e.g. a combination of table info, row info, column info, result values, and font type/color/formats, etc.), and the graphs are output as any image files (gif, jpg, png, or any other image file format), after which they will be automatically imported to the table shells in Excel, Word, PowerPoint or other report file types by simply ONE CLICK of a macro/function button (built in VBA, Python, R, or any programming software with such user-interface).

In an embodiment, we will first design the table shell layout with the groups (e.g. patient groups, year groups, event groups, etc.) in the columns and attributes of the groups (e.g. total observations, specific properties, measurements, subcategories, means, etc.) in the rows. During programming, we will breakdown a table first into columns (groups) and then into individual rows/cells (attributes). The code pieces for calculating the individual row/cell results (e.g. basic "txt_XXX( )" macros or functions) can be used like LEGO bricks. We will pile the code bricks of individual rows/cells (attributes) together to form a code "block" that represents a column (group). With soft coding, we turn this code "block" into a project-specific column filling SAS macro or R function, e.g. named as "Fill_XXX( )". Then, we repeatedly call this macro or function to fill all the different columns (groups) by switching the input group identifier and consequently build the full table.

In an embodiment, during result calculation, the "txt_XXX( )" macros or functions will automatically create a plain text file using specified file name and path, and write all result values into the file line by line with the format of "table|row|col|value". Graphs will be created and saved as image files with the table/row/col information as a tag in the file name. After calculation of all results for a table (e.g. an Excel worksheet), we can open the import automation tools (in Excel, VBA, R, Pyton etc.) spreadsheet or a blank Excel table shell containing the ERP import button. Simply by ONE CLICK of the import buttons, all results in the plain text file or image graph files will be automatically imported into the Excel worksheet having the same file name, and values are injected into the exact locations defined by the row & col numbers. Similarly for table shells in Word or PowerPoint format, the import tools will inject the values/graphs at the exact location of the table/row/col tags.

In an embodiment, the above steps can be repeated for all table shells and the ERP VBA tool can handle multiple TXT/GIF files and multiple table shells at the same time. One can modify the table and change/debug/QC the programs in a very simple, flexible and repeatable manner. users can plug-in their existing tools/macros/functions into the basic code bricks, and unify process afterwards across teams and platforms. There's no need to program a result dataset in SAS or R having the full table shell layout. The output results will have a stamp of table, row & col, therefore can be automatically assembled into a full table during the import to Excel/Word/PowerPoint table shell templates via the ERP import tools.

The ERP shell layout design, programming strategy, and VBA tools can be applied to all platforms that SAS runs on (unix/EG/win-PC) and are also compatible with R, Python, SQL, and so on. The consistency makes cross-platform collaborations very easy and simple. For example, it is very helpful for multi-database PASS studies where you can ask different data sources to build the same minimal dataset and use the same SAS/R programs to produce the same table outputs in the same format and layout.

In summary, the preferred set of embodiments: Needs only Low-Medium level of programming skills, easy for new hires, easy for job hand-over/QC and cross-team staffing. Has Low resource consumption and on average may save substantial analysis hours compared to the "traditional" approach, especially for juniors. Works consistently across all platforms, easy and simple for cross-platform/multi-database collaboration (e.g. PASS studies).

Various advantages: Create the table/footnote/labels only ONCE in xls, no hard coding & low effort; Very flexible to change table design in xls and update coding for placing values in xls (LEGO bricks); High degree of automation in coding design & consistent across all computing platforms (SAS, R . . . ); Can smartly generate "unknown" groups following predefined rules; Easy to modify, add new functions to % txt macros; Typical template sas/R file to reduce errors, easy to debug/QC/hand-over job/collaborate; Immediate view of final deliverable, easy (real-time) to check & find "content" errors; Easy to refresh the whole final deliverable In the following, further embodiments are specified:

Embodiment 1 is a computer implemented method for producing a dedicated report of result values derived from data pre-collected in at least one computing platform, comprising the steps of: (i) generating a report template dataset defining a format of the dedicated report to be generated on a computing device, wherein the report template dataset comprises computer recognizable functional data at least of location pointers to localize where the result values are to be depicted in the dedicated report; (ii) providing a set of calls directed to predefined functions accessible in the at least one computing platform, wherein each call of the set of calls comprises a function identifier associated to one of the predefined functions, a pre-collected data parameter and one of the location pointers; (iii) the predefined functions deriving the result values and coupling the result values to the location pointers of the computer recognizable functional data; (iv) automatically generating an interface dataset being a specific data structure including a number of records for each call of the set of calls, wherein at least one of the number of records of each call of the set of calls comprises the location pointer of the computer recognizable functional data and each of the number of records of the same call comprises one of the result values coupled to the location pointer of the computer recognizable functional data by the associated function; and (v) automatically retrieving the records of the interface dataset and feeding the result values into the dedicated report in accordance with the report template dataset using the location pointers of the computer recognizable functional data.

Embodiment 2 is the computer implemented method of embodiment 1, wherein the at least one computing platform comprises a platform computing device having a platform data processor, a platform data storage and a platform user interface unit, wherein the platform computing device executes a data analysis software for analysing the pre-collected data and preferably a database software for managing the pre-collected data.

Embodiment 3 is the computer implemented method of embodiment 2, comprising a step of configuring the at least one computing platform such that the predefined functions comprise specific functions made accessible in the data analysis software.

Embodiment 4 is the computer implemented method of embodiment 2 or 3, wherein the set of calls directed to the predefined functions is provided in the data analysis software.

Embodiment 5 is the computer implemented method of any one of embodiments 2 to 4, wherein all steps are executed in a physical computing environment comprising the platform computing device, wherein the physical computing environment has a processor structure comprising the platform data processor of the platform computing device, a data storage structure comprising the platform data storage of the platform computing device and a user interface structure comprising the platform user interface unit of the platform computing device.

Embodiment 6 is the computer implemented method of embodiment 5, wherein the physical computing environment is configured to generate the report template dataset by receiving input data via the user interface structure; to determine the format of the data to be reported on the basis of the input data; and to save the report template dataset including the determined format into the data storage structure.

Embodiment 7 is the computer implemented method of embodiment 5 or 6, wherein the physical computing environment comprises a reporting computing device having a reporting data processor, a reporting data storage and a reporting user interface unit, wherein the processor structure of the physical computing environment comprises the reporting data processor of the reporting computing device; the data storage structure of the physical computing environment comprises the reporting data storage of the reporting computing device; the user interface structure of the physical computing arrangement comprises the reporting user interface unit of the reporting computing device; and the reporting computing device executes a reporting software.

Embodiment 8 is the computer implemented method of embodiment 7, wherein the report template dataset is generated in the reporting software executed by the reporting computing device via the user interface unit of the reporting computing device.

Embodiment 9 is the computer implemented method of embodiment 7 or 8, comprising configuring the reporting software executed by the reporting computing device to automatically feed the records of the interface dataset into the dedicated report.

Embodiment 10 is the computer implemented method of embodiment 9, comprising configuring the reporting software executed by the reporting computing device to evaluate the interface dataset and to adapt the format of the dedicated report in accordance with the evaluated interface dataset.

Embodiment 11 is the computer implemented method of embodiment 9 or 10, wherein feeding the records of the interface dataset comprises identifying the location pointer of each of the number of records, identifying the corresponding location pointer of each of the number of records, and positioning the result value associated to each of the number of records into the dedicated report.

Embodiment 12 is the computer implemented method of any one of embodiments 5 to 11, wherein the physical computing environment is configured to set-up the pre-defined functions accessible in the at least one computing platform via the user interface structure, and to save the set-up predefined functions in the data storage structure.

Embodiment 13 is the computer implemented method of any one of embodiments 5 to 12, wherein the physical computing environment is configured to provide the set of calls by inputting each call of the set of calls via the user interface structure and saving the set of calls in the data storage structure.

Embodiment 14 is the computer implemented method of embodiment 12, wherein the physical computing environment is configured to provide a graphical user interface of the user interface structure, to display graphical items representing the calls of the set of calls in the graphical user interface, and to input each call of the set of calls by drag and drop the graphical items displayed in the graphical user interface.

Embodiment 15 is the computer implemented method of embodiment 14, wherein the graphical user interface is configured to display the dedicated report, to receive an update command, to adapt the report template dataset in accordance with the update command and to perform steps (ii) to (v) using the adapted report template dataset.

Embodiment 16 is the computer implemented method of any one of embodiments 5 to 15, wherein the physical computing environment is configured such that generating the interface dataset comprises saving an interface file as a text file in the data storage structure.

Embodiment 17 is the computer implemented method of any one of embodiments 5 to 16, wherein the physical computing environment executes a database software and is configured such that generating the interface dataset comprises the database software storing and managing the interface dataset.

Embodiment 18 is the computer implemented method of any one of embodiments 5 to 17, wherein the physical computing environment executes a database software, and the report template dataset is stored and managed by the database software.

Embodiment 19 is the computer implemented method of any one of embodiments 5 to 18, wherein the physical computing environment is configured such that generating the interface dataset comprises generating either at least one delimited string or one image per record.

Embodiment 20 is the computer implemented method of any one of embodiments 5 to 19, wherein the physical computing environment is configured such that the pre-defined functions called by the calls of the set of calls generate the interface dataset.

Embodiment 21 is the computer implemented method of any one of embodiments 1 to 20, wherein at least one of the calls of the set of calls comprises a calculation command.

Embodiment 22 is the computer implemented method of any one of embodiments 1 to 21, wherein the value of at least one of the number of records of at least one call of the set of calls provided by the associated function comprises a graphical representation.

Embodiment 23 is the computer implemented method of embodiment 22, wherein the interface dataset comprises an image file depicting the graphical representation, wherein the associated location pointer is integrated in the name of the image file.

Embodiment 24 is the computer implemented method of any one of embodiments 5 to 23, wherein the physical computing environment is configured to provide the set of calls by automatically inputting each call of the set of calls with information from the report template dataset and saving the set of calls in the data storage structure.

Embodiment 25 is a computer program comprising instructions which, when the program is executed in a computing environment, cause the computing environment to carry out the method of any one of the embodiments 1 to 24.

Embodiment 26 is a physical computing environment for producing a dedicated report of result values derived from data pre-collected in at least one computing platform, comprising a processor structure, a data storage structure and a user interface structure, wherein the physical computing environment is configured: to generate a report template dataset defining a format of the dedicated report to be generated on a computing device, wherein the report template dataset comprises location pointers to localize where the result values are to be depicted in the dedicated report; to provide a set of calls directed to predefined functions accessible in the at least one computing platform, wherein each call of the set of calls comprises a function identifier associated to one of the predefined functions, a pre-collected data parameter and one of the location pointers; to derive the result values and coupling the result values to the location pointers of the computer recognizable functional data by means of the predefined functions; to automatically generate an interface dataset being a specific data structure including a number of records for each call of the set of calls, wherein at least one of the number of records of each call of the set of calls comprises the location pointer of the computer recognizable functional data and each of the number of records of the same call comprises one of the result values coupled to the location pointer of the computer recognizable functional data by the associated function; and to automatically retrieve the records of the interface dataset and feed the result values into the dedicated report in accordance with the report template dataset using the location pointers of the computer recognizable functional data.

Embodiment 27 is the physical computing environment of embodiment 26, comprising a platform computing device, wherein the processor structure has a platform data processor embodied in the platform computing device, the data storage structure has a platform data storage embodied in the platform computing device and the user interface structure has platform user interface unit embodied in the platform computing device, and the platform computing device executes a data analysis software for analysing the pre-collected data and preferably a database software for managing the pre-collected data.

Embodiment 28 is the physical computing environment of embodiment 27, wherein the platform computing device is configured such that the predefined functions comprise specific functions made accessible in the data analysis software.

Embodiment 29 is the physical computing environment of embodiment 26 or 27, wherein the platform computing device is configured such that the set of calls directed to the predefined functions is provided in the data analysis software.

Embodiment 30 is the physical computing environment of any one of embodiments 26 to 29, configured to generate the report template dataset by receiving input data via the user interface structure, to determine the format of the data to be reported on the basis of the input data, and to save the report template dataset including the determined format into the data storage structure.

Embodiment 31 is the physical computing environment of any one of embodiments 26 to 30, comprising a reporting computing device having a reporting data processor, a reporting data storage and a reporting user interface unit, wherein the processor structure of the physical computing environment comprises the reporting data processor of the reporting computing device, the data storage structure of the physical computing environment comprises the reporting data storage of the reporting computing device, the user interface structure of the physical computing arrangement comprises the reporting user interface unit of the reporting computing device, and the reporting computing device executes a reporting software.

Embodiment 32 is the physical computing environment of embodiment 31, wherein the reporting computing device is configured to generate the report template dataset in the reporting software executed by the reporting computing device via the user interface unit of the reporting computing device.

Embodiment 33 is the physical computing environment of embodiment 31 or 32, wherein the reporting computing device is configured to automatically feed the records of the interface dataset into the dedicated report in the reporting software executed by the reporting computing device.

Embodiment 34 is the physical computing environment of embodiment 33, wherein the reporting computing device is configured to feed the records of the interface dataset by identifying the location pointer of each of the number of records, identifying the corresponding location pointer of each of the number of records, and positioning the result value associated to each of the number of records into the dedicated report.

Embodiment 35 is the physical computing environment of any one of embodiments 26 to 34, configured to set-up the predefined functions accessible in the at least one computing platform via the user interface structure, and to save the set-up predefined functions in the data storage structure.

Embodiment 36 is the physical computing environment of any one of embodiments 26 to 35, configured to provide the set of calls by inputting each call of the set of calls via the user interface structure, and saving the set of calls in the data storage structure.

Embodiment 37 is the physical computing environment of embodiment 36, configured to provide a graphical user interface of the user interface structure, to display graphical items representing the calls of the set of calls in the graphical user interface, and to input each call of the set of calls by drag and drop the graphical items displayed in the graphical user interface.

Embodiment 38 is the physical computing environment of embodiment 37, wherein the graphical user interface is configured to display the dedicated report, to receive an update command, to adapt the report template dataset in accordance with the update command and to perform the provision of the set of calls, the derivation of the result values, the generation of the interface dataset, the retrieval of the records of the interface dataset and the feeding of the records of the interface dataset using the adapted report template dataset.

Embodiment 39 is the physical computing environment of any one of embodiments 26 to 38, configured to generate the interface dataset by saving an interface file as a text file in the data storage structure.

Embodiment 40 is the physical computing environment of any one of embodiments 26 to 39, executing a database software and configured to generate the interface dataset by the database software storing and managing the interface dataset.

Embodiment 41 is the physical computing environment of any one of embodiments 26 to 40, executing a database software and configured to generate the interface dataset by the database software storing and managing the report template dataset.

Embodiment 42 is the physical computing environment of any one of embodiments 26 to 41, configured to generate the interface dataset by generating either at least one delimited string or one image per record.

Embodiment 43 is the physical computing environment of any one of embodiments 26 to 42, configured to generate the interface dataset by the predefined functions called by the calls of the set of calls.

Embodiment 44 is the physical computing environment of any one of embodiments 26 to 43, wherein at least one of the calls of the set of calls comprises a calculation command.

Embodiment 45 is the physical computing environment of any one of embodiments 26 to 44, wherein the value of at least one of the number of records of at least one call of the set of calls provided by the associated function comprises a graphical representation.

Embodiment 46 is the physical computing environment of embodiment 45, wherein the interface dataset comprises an image file depicting the graphical representation, wherein the associated location pointer is integrated in the name of the image file.

Embodiment 47 is the physical computing environment of any one of embodiments 26 to 46, configured to provide the set of calls by automatically inputting each call of the set of calls with information from the report template dataset, and saving the set of calls in the data storage structure.

Embodiment 48 is a computer implemented method for producing a dedicated Electronic Presentation Document (EPD) of Result Values derived from data pre-collected in at least one computing platform, comprising the steps of: (i) generating an EPD Template Dataset defining a format of the EPD to be generated on a computing device, wherein the EPD Template Dataset comprises computer recognizable functional parameter at least of technical Location Pointers to localize where the Result Values are to be depicted by the computer in the EPD; (ii) providing a set of calls directed to predefined functions accessible in the at least one computing platform, wherein each call of the set of calls comprises a function identifier associated to one of the predefined functions, one or more pre-collected data parameter, and one of the technical Location Pointers; (iii) the predefined functions deriving the Result Values from the pre-collected data and coupling the Result Values to the corresponding technical Location Pointers; (iv) automatically generating one or more technical Interface Dataset being a specific technical data structure including a number of records for each call of the set of calls, wherein at least one of the number of records of each call of the set of calls comprises a technical Location Pointer, and each of the number of records of the same call comprises one of the Result Values that coupled to the technical Location Pointer by the associated predefined function; and (v) with the EPD Engine, automatically retrieving the records of the technical Interface Dataset and feeding the Result Values into the EPD in accordance with the EPD Template Dataset using the technical Location Pointers.

Embodiment 49 is the computer implemented method of embodiment 48, wherein the method can be executed and distributed in one or more computing platforms, wherein each of the physical computing platform comprises a platform data processor, a platform data storage, and a platform user interface structure, wherein one or more physical computing platform can be configured accordingly to perform partial or the whole of the method, and wherein the one or more platform computing device executes data processing software or related application programs required by the method.

Embodiment 49 is the computer implemented method of embodiment 48, wherein the computer recognizable functional parameter of the Location Pointers is a technical parameter that controls the computer to localize a specific location within the EPD to perform its tasks and is particularly implementable, recognizable, and inter-operable by multiple types of scripting software, reporting software, EPD file types, application programs, and computing platforms.

Embodiment 50 is the computer implemented method of embodiment 48, wherein the technical Interface Dataset is one or more specific technical data structure that comprises the technical Location Pointers, in the form of files and/or database systems, and is particularly implementable, recognizable, and inter-operable by multiple types of scripting software, reporting software, application programs, and computing platforms.

Embodiment 51 is the computer implemented method of embodiment 48, wherein the Result Value of at least one of the number of records of at least one call of the set of calls derived by the associated predefined function comprises a graphical representation, and wherein the Result Value can also be in the form of number, text, image, audio, video, or the like.

Embodiment 52 is the computer implemented method of embodiment 48, wherein the EPD Template Dataset comprises additional computer recognizable functional parameters associated to the technical Location Pointers, wherein the additional functional parameters can be provided within the calls to the associated predefined functions, wherein the additional functional parameters can be coupled to the corresponding technical Location Pointers by the associated predefined functions, wherein the additional functional parameters can be written into the corresponding records of the technical Interface Dataset, and wherein the additional functional parameters can be executed by the EPD Engine and control the computer to perform additional operations at the corresponding location in the EPD in accordance to the technical Location Pointers.

Embodiment 53 is the computer implemented method of embodiment 48, wherein the EPD Engine can be a computer program on its own, and/or as a module integrated into the data processing software or reporting software executed by the one or more computing platform; wherein the EPD Engine can be configured to operate the technical Interface Dataset, including but not limited to modify or delete the technical Interface Dataset; wherein the EPD Engine can be configured to operate the EPD Template Dataset, including but not limited to generate actual technical Location Pointers for the EPD Template Dataset or feed Result Values directly into the EPD Template Dataset; wherein the EPD Engine can be configured to operate the EPD, including but not limited to adapt the EPD layout according to the technical Interface Dataset.

Embodiment 54 is a physical computing environment that is configured to execute the computer implemented method of any one of embodiments 48 to 53, wherein the physical computing environment is configured to provide a graphical user interface of the user interface structure, to display graphical items representing the calls of the set of calls in the graphical user interface, to input each call of the set of calls by drag and drop of the graphical items displayed in the graphical user interface, and to display the corresponding technical Location Pointer when pointing the cursor on a graphical item at a specific location of the EPD template in the graphical user interface.

Embodiment 55 is a computer implemented method for producing a dedicated Electronic Application User Interface (EAUI) of Result Values derived from data pre-collected in at least one computing platform, comprising the steps of: (i) generating an EAUI Template Dataset defining a format of the EAUI to be generated on a computing device, wherein the EAUI Template Dataset comprises computer recognizable functional parameter at least of technical Location Pointers to localize where the Result Values are to be depicted by the computer in the EAUI; (ii) providing a set of calls directed to predefined functions accessible in the at least one computing platform, wherein each call of the set of calls comprises a function identifier associated to one of the predefined functions, one or more pre-collected data parameter, and one of the technical Location Pointers; (iii) the predefined functions deriving the Result Values from the pre-collected data and coupling the Result Values to the corresponding technical Location Pointers; (iv) automatically generating one or more technical Interface Dataset being a specific technical data structure including a number of records for each call of the set of calls, wherein at least one of the number of records of each call of the set of calls comprises a technical Location Pointer, and each of the number of records of the same call comprises one of the Result Values that coupled to the technical Location Pointer by the associated predefined function; and (v) with the EAUI Engine, automatically retrieving the records of the technical Interface Dataset and feeding the Result Values into the EAUI in accordance with the EAUI Template Dataset using the technical Location Pointers.

Embodiment 56 is the computer implemented method of embodiment 55, wherein the method can be executed and distributed in one or more computing platforms; wherein each of the physical computing platform comprises a platform data processor, a platform data storage, and a platform user interface structure; wherein one or more physical computing platform can be configured accordingly to perform partial or the whole of the method; and wherein the one or more platform computing device executes data processing software or related application programs required by the method.

Embodiment 57 is the computer implemented method of embodiment 55, wherein the computer recognizable functional parameter of the Location Pointers is a technical parameter that controls the computer to localize a specific location within the EAUI to perform its tasks and is particularly implementable, recognizable, and inter-operable by multiple types of scripting software, reporting software, EAUI structures, application programs, and computing platforms.

Embodiment 58 is the computer implemented method of embodiment 55, wherein the technical Interface Dataset is one or more specific technical data structure that comprises the technical Location Pointers, in the form of files and/or database systems, and is particularly implementable, recognizable, and inter-operable by multiple types of scripting software, reporting software, application programs, and computing platforms.

Embodiment 59 is the computer implemented method of embodiment 55, wherein the Result Value of at least one of the number of records of at least one call of the set of calls derived by the associated predefined function comprises a graphical representation, and wherein the Result Value can also be in the form of number, text, image, audio, video, or the like.

Embodiment 60 is the computer implemented method of embodiment 55, wherein the EAUI Template Dataset comprises additional computer recognizable functional parameters associated to the technical Location Pointers, wherein the additional functional parameters can be provided within the calls to the associated predefined functions, wherein the additional functional parameters can be coupled to the corresponding technical Location Pointers by the associated predefined functions, wherein the additional functional parameters can be written into the corresponding records of the technical Interface Dataset, and wherein the additional functional parameters can be executed by the EAUI Engine and control the computer to perform additional operations at the corresponding location in the EAUI in accordance to the technical Location Pointers.

Embodiment 61 is the computer implemented method of embodiment 55, wherein the EAUI Engine can be a computer program on its own, and/or as a module integrated into the application programs supporting the EAUI and executed by the one or more computing platform; wherein the EAUI Engine can be configured to operate the technical Interface Dataset, including but not limited to modify or delete the technical Interface Dataset; wherein the EAUI Engine can be configured to operate the EAUI Template Dataset, including but not limited to generate actual technical Location Pointers for the EAUI Template Dataset or feed Result Values directly into the EAUI Template Dataset; wherein the EAUI Engine can be configured to operate the EAUI, including but not limited to adapt the EAUI layout according to the technical Interface Dataset.

Embodiment 62 is a physical computing environment that is configured to execute the computer implemented method of any one of embodiments 55 to 61, wherein the physical computing environment is configured to provide a graphical user interface of the user interface structure, to display graphical items representing the calls of the set of calls in the graphical user interface, to input each call of the set of calls by drag and drop of the graphical items displayed in the graphical user interface, and to display the corresponding technical Location Pointer when pointing the cursor on a graphical item at a specific location of the EAUI template in the graphical user interface.

This description and the accompanying drawings that illustrate aspects and embodiments of the present invention should not be taken as limiting-the claims defining the protected invention. In other words, while the invention has been illustrated and described in detail in the drawings and foregoing description, such illustration and description are to be considered illustrative or exemplary and not restrictive. Various mechanical, compositional, structural, electrical, and operational changes may be made without departing from the spirit and scope of this description and the claims.

In some instances, well-known circuits, structures and techniques have not been shown in detail in order not to obscure the invention. Thus, it will be understood that changes and modifications may be made by those of ordinary skill within the scope and spirit of the following claims. In particular, the present invention covers further embodiments with any combination of features from different embodiments described above and below.

The disclosure also covers all further features shown in the Figs. individually although they may not have been described in the afore or following description. Also, single alternatives of the embodiments described in the figures and the description and single alternatives of features thereof can be disclaimed from the subject matter of the invention or from disclosed subject matter. The disclosure comprises subject matter consisting of the features defined in the claims or the exemplary embodiments as well as subject matter comprising said features.

Furthermore, in the claims the word "comprising" does not exclude other elements or steps, and the indefinite article "a" or "an" does not exclude a plurality. A single unit or step may fulfil the functions of several features recited in the claims. The mere fact that certain measures are recited in mutually different dependent claims does not indicate that a combination of these measures cannot be used to advantage. Components described as coupled or connected may be electrically or mechanically directly coupled, or they may be indirectly coupled via one or more intermediate components. Any reference signs in the claims should not be construed as limiting the scope.

A computer program may be stored/distributed on a suitable medium, such as an optical storage medium or a solid-state medium supplied together with or as part of other hardware, but may also be distributed in other forms, such as via the Internet or other wired or wireless telecommunication systems. In particular, e.g., a computer program can be a computer program product stored on a computer readable medium which computer program product can have computer executable program code adapted to be executed to implement a specific method such as the method according to the invention. Furthermore, a computer program can also be a data structure product or a signal for embodying a specific method such as the method according to the invention.

What is claimed is:

1. A computer implemented method for producing an Electronic Report Presentation ("ERP") of result values derived from data pre-collected in at least one computing platform, comprising the steps of:
   (i) generating an ERP template dataset defining a format of the ERP to be generated on a computing device, wherein the ERP template dataset comprises computer recognizable functional data at least of technical location pointers to localize where the result values are to be depicted in the ERP;
   (ii) providing a set of calls directed to predefined functions accessible in the at least one computing platform, wherein each call of the set of calls comprises a function identifier associated to one of the predefined functions, a pre-collected data parameter and one of the technical location pointers;
   (iii) the predefined functions deriving the result values and coupling the result values to the technical location pointers;
   (iv) automatically generating a technical interface dataset being a specific data structure including a number of output records for each call of the set of calls, wherein at least one of the number of output records of each call of the set of calls comprises a technical location pointer and each of the number of output records of a same call comprises one of the result values coupled to the technical location pointer by an associated function; and
   (v) automatically retrieving the output records of the technical interface dataset and feeding the result values into the ERP in accordance with the ERP template dataset using the technical location pointers.

2. A computer implemented method for producing an Electronic Report Presentation ("ERP") of result values derived from data pre-collected in at least one computing platform, comprising:
   (i) providing a set of calls directed to predefined functions accessible in the at least one computing platform, wherein each call of the set of calls comprises a function identifier associated to one of the predefined functions, one or more pre-collected data parameters and one specific technical location pointer, wherein the specific technical location pointer is a computer recognizable functional parameter comprising at least two parts to localize where at least one of the result values is to be depicted in the ERP;
   (ii) the predefined functions deriving the result values from the pre-collected data and coupling the result values to specific technical location pointers corresponding to each call of the set of calls;
   (iii) automatically generating one or more technical interface dataset being a specific technical data structure including a number of output records for each call of the set of calls, wherein at least one of the number of output records of each call of the set of calls comprises the specific technical location pointer, and wherein each of the number of output records of a same call comprises one of the result values coupled to the specific technical location pointer by an associated predefined function; and
   (iv) automatically retrieving output records of the technical interface dataset and feeding the result values into the ERP in accordance with an ERP template dataset using the specific technical location pointers, wherein the ERP template dataset is defining a format and structure of the ERP to be generated on a computing device, wherein the result values can be fed directly into the ERP template dataset, and wherein this step is performed by a particular ERP engine.

3. The computer implemented method of claim 2, further comprising:
   generating the ERP template dataset using at least one ERP software via a graphical user interface structure,
   wherein at least one ERP template structure comprising pre-populated content and a number of placeholders where the result values are to be depicted is created and saved in the ERP template dataset, and
   wherein the at least one ERP template structure comprises a number of computer recognizable data parameters, including but not limited to functional parameters for further calculation of the result values, and meta parameters for controlling an appearance of the result values in the ERP like formatting and layout.

4. The computer implemented method of claim 2, further comprising a step of configuring the at least one computing platform such that
   the predefined functions comprise generic functions provided by the computing platform, the predefined functions are made accessible in the computing platform to the set of calls, and at least one of the predefined functions executes a calculation on the pre-collected data to derive at least one of the result values.

5. The computer implemented method of claim 2, wherein the specific technical location pointer is defined and used following at least one specific rule predefined in the particular ERP engine comprising a first part being used to identify a specific structure within the ERP, and a second part being used to identify a specific substructure within the ERP, wherein depending on the at least one specific rule, localizing the result values within the ERP is either before, in, after, or by replacing the specific substructure identified with the second part of the technical location pointer.

6. The computer implemented method of claim 2, wherein the specific technical location pointer is designed in a format automatically generatable in accordance with an ERP template structure.

7. The computer implemented method of claim 2, wherein the specific technical location pointer is designed in a unified format comprising at least two different formats, wherein each format of the at least two different formats is defined and used following at least one specific rule predefined in at least one software, and wherein the unified format is applicable in at least two different software.

8. The computer implemented method of claim 2, wherein at least one of the predefined functions derives an additional result value, and at least one part of the specific technical location pointer that is associated to the at least one of the predefined functions and comprises at least two parts, is used to automatically generate an additional specific technical location pointer for the additional result value.

9. The computer implemented method of claim 2, wherein a result value derived by a predefined function of the predefined functions is one of a number, text string, graphical representation, image, video, audio, or a combination thereof.

10. The computer implemented method of claim 2, wherein the result values are stored in a file of the technical interface dataset and an associated specific technical location pointer is integrated in a name of the file.

11. The computer implemented method of claim 2, wherein generating the technical interface dataset comprises generating either at least one delimited string or one file per output record and saving such delimited string or file in a data storage structure, wherein a corresponding result value of each output record is embedded in the at least one delimited string or the file, and wherein, preferably, the delimited string is saved in a text file.

12. The computer implemented method of claim 7, wherein the technical interface dataset is a specific technical data structure storing the specific technical location pointers in the unified format.

13. The computer implemented method of claim 2, further comprising a step of providing and saving at least one additional computer recognizable data parameter in at least one of the output records in the technical interface dataset, wherein the additional data parameter is configured to instruct the particular ERP engine to perform further processing of the result values according to a predefined rule, or wherein the additional data parameter is configured to instruct the particular ERP engine to adapt an ERP template structure or to adapt an appearance of the result values of the corresponding output record in the ERP, including but not limited to formatting, style, and layout, or wherein the additional data parameter is configured to instruct the particular ERP engine to position a further data parameter into the ERP at a location according to the specific technical location pointer coupled to the at least one of the output records and a predefined rule.

14. The computer implemented method of claim 2, wherein feeding the output records of the technical interface dataset by the particular ERP engine comprises identifying the specific technical location pointer of each of the number of output records, identifying a corresponding location within the ERP using the specific technical location pointer, and positioning a result value associated to each of the number of output records at a location of the ERP where the result value is to be depicted, or wherein feeding the output records of the technical interface dataset by the particular ERP engine comprises identifying each of the specific technical location pointers saved in the ERP template dataset, identifying the output record within the technical interface dataset comprising a same specific technical location pointer, retrieving the result value from the output record, and positioning the result value to the location in the ERP where the result value is to be depicted in accordance to the specific technical location pointer.

15. The computer implemented method of claim 2, wherein the particular ERP engine is a specific software configured to automatically feed the output records of the technical interface dataset into the ERP, wherein the ERP engine is further configured to evaluate the technical interface dataset and to adapt a format of the ERP in accordance with the evaluated technical interface dataset, and/or wherein the ERP engine is further configured to insert additional data parameter into the ERP at locations in accordance with the evaluated technical interface dataset.

16. The computer implemented method of claim 2, wherein the particular ERP engine is a specific software configured to automatically feed the output records of the technical interface dataset into the ERP, wherein the particular ERP engine is further configured to modify the technical interface dataset, including but not limited to edit, copy, and delete, and/or wherein the particular ERP engine is further configured to modify the ERP template dataset, including but not limited to automatically generate the specific technical location pointers for the placeholders in accordance with the ERP template dataset.

17. The computer implemented method of claim 2, comprising executing a database software and the database software storing and managing the set of calls, the predefined functions, the technical interface dataset, the ERP template dataset, and the ERP, wherein, a user interface is used to control the database software.

18. The computer implemented method of claim 2, comprising providing a graphical user interface, displaying graphical items representing each call of the set of calls and display an ERP template representing the ERP template dataset in the graphical user interface, automatically inputting each call of the set of calls by drag and drop the graphical items onto the ERP template displayed in the graphical user interface, saving the ERP template comprising the graphical items into the ERP template dataset in a data storage structure.

19. The computer implemented method of claim 2, comprising providing a graphical user interface and to display the ERP, receiving an update command, adapting the ERP template dataset in accordance with the update command and performing steps (i) to (iv) using the adapted ERP template dataset.

20. The computer implemented method of claim 2, wherein generating the technical interface dataset comprises storing and managing the output records of result values and corresponding technical location pointers coupled by the associated predefined functions.

21. The computer implemented method of claim 5, wherein:

the ERP has at least one additional structure, the specific technical location pointer further includes at least one additional part to identify the at least one additional structure, and two parts of the first part, the second part, and the at least one additional part comprise numeric characters.

22. The computer implemented method of claim 18, wherein the graphical user interface automatically displays corresponding specific technical location pointer and/or specific calls when pointing a cursor on a graphical item at a specific location of the ERP template in the graphical user interface.

23. A physical computing environment, with or without a server-like configuration, for producing an ERP of result values derived from data pre-collected in at least one computing platform, comprising a processor structure including a platform data processor, a data storage structure and a user interface structure, wherein the physical computing environment is configured to execute the computer implemented method of claim 2.

* * * * *